United States Patent
Berini

(10) Patent No.: US 6,741,782 B2
(45) Date of Patent: May 25, 2004

(54) OPTICAL WAVEGUIDE STRUCTURES

(75) Inventor: Pierre Simon Joseph Berini, Ottawa (CA)

(73) Assignee: Spectalis Corp., Nepean (CA)

( * ) Notice: Subject to any disclaimer, the term of this patent is extended or adjusted under 35 U.S.C. 154(b) by 103 days.

(21) Appl. No.: 10/177,621

(22) Filed: Jun. 21, 2002

(65) Prior Publication Data

US 2003/0059147 A1 Mar. 27, 2003

Related U.S. Application Data

(63) Continuation-in-part of application No. 09/629,816, filed on Jul. 31, 2000, now Pat. No. 6,442,321, and a continuation-in-part of application No. 09/742,422, filed on Dec. 22, 2000, now Pat. No. 6,614,960.
(60) Provisional application No. 60/299,732, filed on Jun. 22, 2001.

(51) Int. Cl.$^7$ .............................. G02B 6/10; G02B 6/12
(52) U.S. Cl. ..................... 385/130; 385/129; 385/2; 385/14; 385/31
(58) Field of Search ............................. 385/1, 2, 3, 11, 385/15, 14, 31, 39, 42, 50, 129–132

(56) References Cited

U.S. PATENT DOCUMENTS 6,442,321 B1 * 8/2002 Berini ........................ 385/130
6,614,960 B2 * 9/2003 Berini ........................ 385/39

FOREIGN PATENT DOCUMENTS

EP          0365766 A      5/1990

OTHER PUBLICATIONS

Bozhevolynyi S I et al: Waveguiding in surface Plasmon Polariton Band Gap Structures, Physical Review Letters, New York, NY, US vol. 86, No. 14, Apr. 2, 2001.
Charbonneau, R. Berini, P. et al. "Long–Range Plasmon–Polariton Wave Propagation in Thin Metal Films of Finite–Width Excited Using an End–Fire Technique", Proceedings of SPIE, vol. 4087, p. 534, 2000.
Berini P: "Plasmon–Polariton Modes Guided By A Metal Film Of Finite Width"; Optics Letters, Optical Society of America, Washington, US, vol. 24, No. 15, Aug. 1, 1999.
Berini P: "Plasmon–Polariton Modes Guided By A metal Film Of Finite Width Bounded By Different Dielectrics", Optics Express, Optical Society of America, Washington, US, vol. 7, No. 10, Nov. 6, 2000.
Berini P: "Plasmon–Polariton Modes Guided By Thin Lossy Metal Films Of Finite Width: Bound Modes Of Asymmetric Structures", Physical Review B (Condensed Matter and Materials Physics), APS through AIP US, vol. 63, No. 12.

* cited by examiner

Primary Examiner—Brian Healy
Assistant Examiner—Kevin S Wood
(74) Attorney, Agent, or Firm—Thomas Adams

(57) ABSTRACT

An optical device comprises a waveguide structure formed by a strip (100) of a material having a relatively high free charge carrier density surrounded by a material having a relatively low free charge carrier density. The strip has finite width (W) and thickness (t) of the same order with dimensions such that optical radiation having a wavelength in a predetermined range couples to the strip and propagates along the length of the strip as a plasmon-polariton wave. Preferably the width and thickness are substantially equal and less than about 300 nm.

98 Claims, 30 Drawing Sheets

Prior Art

OPTICAL WAVEGUIDE STRUCTURES

CROSS-REFERENCE TO RELATED APPLICATIONS

This application claims priority from United States Provisional patent application serial No. 60/299,732 filed Jun. 22, 2001 and is a Continuation-in-Part of application Ser. No. 09/629,816 filed Jul. 31, 2000 now U.S. Pat. No. 6,442,321 and a Continuation-in-Part of application Ser. No. 09/742,422 filed Dec. 22, 2000 now U.S. Pat. No. 6,614,961. The contents of these three applications are incorporated herein by reference.

TECHNICAL FIELD

The invention relates to optical devices and is especially applicable to waveguide structures and integrated optics.

BACKGROUND ART

This specification refers to several published articles. For convenience, the articles are cited in fill in a numbered list at the end of the description and cited by number in the specification itself. Their contents are incorporated herein by reference.

In the context of this patent specification, the term "optical radiation" embraces electromagnetic waves having wavelengths in the infrared, visible and ultraviolet ranges.

The terms "finite" and "infinite" as used herein are used by persons skilled in this art to distinguish between waveguides having "finite" widths in which the actual width is significant to the performance of the waveguide and the physics governing its operation and so-called "infinite" waveguides where the width is so great that it has no significant effect upon the performance and physics of operation.

As explained in copending international patent application No. PCT/CA00/01525, the contents of which are incorporated herein by reference, at optical wavelengths, the electromagnetic properties of some metals closely resemble those of an electron gas, or equivalently of a cold plasma. Metals that resemble an almost ideal plasma are commonly termed "noble metals" and include, among others, gold, silver and copper. Numerous experiments as well as classical electron theory both yield an equivalent negative dielectric constant for many metals when excited by an electromagnetic wave at or near optical wavelengths [1,2]. In a recent experimental study, the dielectric function of silver has been accurately measured over the visible optical spectrum and a very close correlation between the measured dielectric function and that obtained via the electron gas model has been demonstrated [3].

It is known that the interface between semi-infinite materials having positive and negative dielectric constants can guide TM (Transverse Magnetic) surface waves. In the case of a metal-dielectric interface at optical wavelengths, these waves are termed plasmon-polariton modes and propagate as electromagnetic fields coupled to surface plasmons (surface plasma oscillations) comprised of conduction electrons in the metal [4].

It is known to use a metal film of a certain thickness bounded by dielectrics above and below as an optical slab (planar, infinitely wide) waveguiding structure, with the core of the waveguide being the metal film. When the film is thin enough, the plasmon-polariton modes guided by the interfaces become coupled due to field tunnelling through the metal, thus creating supermodes that exhibit dispersion with metal thickness. The modes supported by infinitely wide symmetric and asymmetric metal film structures are well-known, as these structures have been studied by numerous researchers; some notable published works include references [4] to [10].

In general, only two purely bound TM modes, each having three field components, are guided by an infinitely wide metal film waveguide. In the plane perpendicular to the direction of wave propagation, the electric field of the modes is comprised of a single component, normal to the interfaces and having either a symmetric or asymmetric spatial distribution across the waveguide. Consequently, these modes are denoted $s_b$ and $a_b$ modes, respectively. The $s_b$ mode can have a small attenuation constant and is often termed a long-range surface plasmon-polariton. The fields related to the $a_b$ mode penetrate further into the metal than in the case of the $s_b$ mode and can be much lossier by comparison. Interest in the modes supported by thin metal films has recently intensified due to their useful application in optical communications devices and components. Metal films are commonly employed in optical polarizing devices [11] while long-range surface plasmon-polaritons can be used for signal transmission [7]. In addition to purely bound modes, leaky modes are also known to be supported by these structures.

Infinitely wide metal film structures, however, are of limited practical interest since they offer one-dimensional (1-D) field confinement only, with confinement occurring along the vertical axis perpendicular to the direction of wave propagation, implying that modes will spread out laterally as they propagate from a point source used as the excitation. Metal films of finite width have recently been proposed in connection with polarizing devices [12], but merely as a cladding.

In addition to the lack of lateral confinement, plasmon-polariton waves guided by a metal-dielectric interface are in general quite lossy. Even long-range surface devices exploit this high loss associated with surface plasmons for the construction of plasmon-polariton based modulators and switches. Generally, known plasmon-polariton based modulator and switch devices can be classified along two distinct architectures. The first architecture is based on the phenomenon of attenuated total reflection (ATR) and the second architecture is based on mode coupling between a dielectric waveguide and a nearby metal. Both architectures depend on the dissipation of optical power within an interacting metal structure.

ATR based devices depend on the coupling of an optical beam, which is incident upon a dielectric-metal structure placed in optical proximity, to a surface plasmon-polariton mode supported by the metal structure. At a specific angle of incidence, which depends on the materials used and the particular geometry of the device, coupling to a plasmon mode is maximised and a drop in the power reflected from the metal surface is observed ATR based modulators make use of this attenuated reflection phenomenon along with means for varying electrically or otherwise at least one of the optical parameters of one of the dielectrics bounding the metal structure in order to shift the angle of incidence where maximum coupling to plasmons occurs. Electrically shifting the angle of maximum coupling results in a modulation of the intensity of the reflected light. Examples of devices that are based on this architecture are disclosed in references [23] to [36]. Reference [42] discusses an application of the ATR phenomenon for realising an optical switch or bistable device.

Mode coupling devices are based on the optical coupling of light propagating in a dielectric waveguide to a nearby metal film placed a certain distance away and in parallel with the dielectric waveguide. The coupling coefficient between the optical mode propagating in the waveguide and the plasmon-polariton mode supported by the nearby metal film is adjusted via the materials selected and the geometrical parameters of the device. Means are provided for varying, electrically or otherwise, at least one of the optical parameters of one of the dielectrics bounding the metal. Varying an optical parameter (the index of refraction, say) varies the coupling coefficient between the optical wave propagating in the dielectric waveguide and the lossy plasmon-polariton wave supported by the metal. This results in a modulation in the intensity of the light exiting the dielectric waveguide. References [37] to [40] disclose various device implementations based upon this phenomenon. Reference [41] farther discusses the physical phenomenon underlying the operation of these devices.

These known modulation and switching devices disadvantageously require relative high control voltages and have limited electrical/optical bandwidth.

The aforementioned co-pending international patent application No. PCT/CA00/01525 disclosed a waveguide structure comprising a thin strip having finite width and thickness with dimensions such that optical radiation having a wavelength in a predetermined range couples to the strip and propagates along the length of the strip as a plasmon-polariton wave. The strip may comprise a material having a relatively high free charge carrier density, for example a conductor or certain classes of highly-doped semiconductor. The surrounding material may have a relatively low free charge carrier density, i.e. an insulator or an undoped or lightly doped semiconductor.

Such a strip of finite width offers two-dimensional (2-D) confinement in the transverse plane, i.e. perpendicular to the direction of propagation, and, since suitable low-loss waveguides can be fabricated from such strip, it is useful for signal transmission and routing or to construct components such as couplers, power splitters, interferometers, modulators, switches and other typical components of integrated optics. In such devices, different sections of the strip serve different functions, in some cases in combination with additional electrodes. The strip sections may be discrete and concatenated or otherwise interrelated, or sections of one or more continuous strips.

A characteristic of such a thin, finite-width plasmon-polariton waveguide is polarization sensitivity. In particular, external radiation linearly polarised along the direction perpendicular to the plane of the strip is coupled effectively to the waveguide in an end-fire arrangement.

An object of the present invention is to provide a low-loss polarisation insensitive plasmon-polariton waveguide structure.

DISCLOSURE OF INVENTION

The present invention seeks to eliminate, or at least mitigate, one or more of the disadvantages of the prior art.

According to one aspect of the present invention there is provided a waveguide structure comprising a strip having a substantially square cross-section with dimensions of the same order (less than 10) such that optical radiation having a wavelength in a predetermined range couples to the strip and propagates along the length of the strip as a plasmon-polariton wave. The strip may comprise a material having a relatively high free charge carrier density, for example a conductor or certain classes of highly-doped semiconductor. The surrounding material may have a relatively low free charge carrier density, i.e. an insulator or an undoped or lightly doped semiconductor.

Such a strip of finite width offers two-dimensional (2-D) confinement in the transverse plane, i.e. perpendicular to the direction of propagation, and, since suitable low-loss waveguides can be fabricated from such strip, it is useful for signal transmission and routing or to construct components such as couplers, power splitters, interferometers, modulators, switches and other typical components of integrated optics. In such devices, different sections of the strip serve different functions, in some cases in combination with additional electrodes. The strip sections may be discrete and concatenated or otherwise interrelated, or sections of one or more continuous strips.

For example, where the optical radiation has a freespace wavelength of 1550 nm, and the waveguide is made of a strip of a noble metal surrounded by a good dielectric, say glass, suitable dimensions for the square cross-section strip are a thickness and width of about 200 nm to 150 nm, preferably about 180 nm.

The strip could be straight, curved, bent, tapered, and so on.

The dielectric material may be inhomogeneous, for example a combination of slabs, strips, laminae, and so on. The conductive or semiconductive strip may be inhomogeneous, for example a gold layer sandwiched between thin layers of titanium.

The plasmon-polariton wave which propagates along the structure may be excited by an appropriate optical field incident at one of the ends of the waveguide, as in an end-fire configuration, and/or by a different radiation coupling means.

The low free-carrier density material may comprise two distinct portions with the strip extending therebetween, at least one of the two distinct portions having at least one variable electromagnetic property, and the device then may further comprise means for varying the value of said electromagnetic property of said one of the portions so as to vary the propagation characteristics of the waveguide structure and the propagation of the plasmon-polariton wave.

In some embodiments of the invention, for one said value of the electromagnetic property, propagation of the plasmon-polariton wave is supported and, for another value of said electromagnetic property, propagation of the plasmon-polariton wave is at least inhibited. Such embodiments may comprise modulators or switches.

Different embodiments of the invention may employ different means of varying the electromagnetic property, such as varying the size of at least one of said portions, especially if it comprises a fluid.

The at least one variable electromagnetic property of the material may comprise permittivity, permeability or conductivity.

Where the portion comprises an electro-optic material, the variable electromagnetic property will be permittivity, which may be varied by applying an electric field to the portion, or changing an electric field applied thereto, using suitable means.

Where the portion comprises a magneto-optic material, the variable electromagnetic property will be permittivity which may be varied by applying a magnetic field to the portion or changing a magnetic field applied thereto, using suitable means.

Where the portion comprises a thermo-optic material, the electromagnetic property may be permittivity and be varied by changing the temperature of the material.

Where the portion comprises an acousto-optical (photoelastic) material, the electromagnetic property may be permittivity and be varied by changing mechanical strain in the material.

Where the portion comprises a magnetic material (such as a ferrite), the electromagnetic property will be permeability and may be varied by applying a magnetic field to the material or changing a magnetic field applied thereto, by suitable means.

Where the portion comprises a semiconductor material, the electromagnetic property will be conductivity or permittivity and may be varied by changing free charge carrier density in said portion, using suitable means.

Additionally or alternatively, the propagation of the plasmon-polariton wave may be varied by varying an electromagnetic property of the strip. For example, the permittivity of the strip may be varied by changing the free charge carrier density or by changing or applying a magnetic field through the strip.

Various objects, features, aspects and advantages of the present invention will become more apparent from the following detailed description, taken in conjunction with the accompanying drawings, of a preferred embodiment of the invention.

DESCRIPTION OF THE PREFERRED EMBODIMENTS

Figure 1:
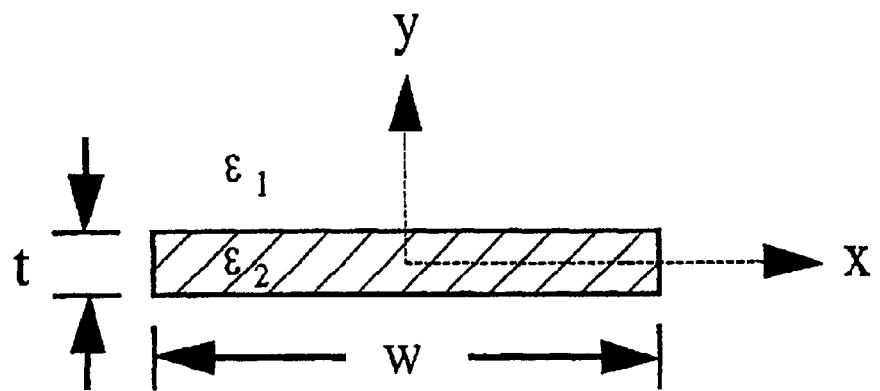
FIGS. 1(a) and 1(b), labelled PRIOR ART, are a cross-sectional illustration and a plan view, respectively, of a symmetric waveguide structure as disclosed and claimed in copending PCT application No. PCT/CA00/01525, in which the core is comprised of a lossy metal film of thickness t, width w, length l and permittivity $\epsilon_2$ embedded in a cladding or background comprising an "infinite" homogeneous dielectric having a permittivity $\epsilon_1$.
Figure 1:
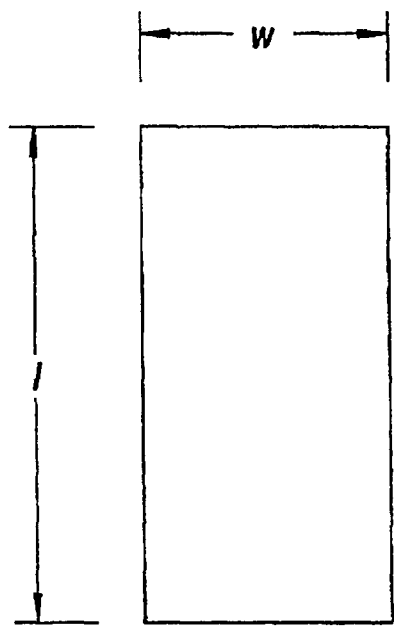
Figure 2:
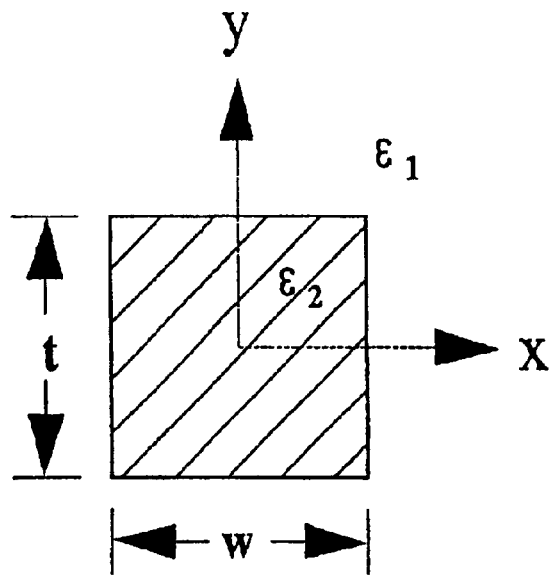
FIGS. 2(a) and 2(b) are a cross-sectional illustration and a plan view, respectively, of a symmetric waveguide structure having a substantially square metal cross-section of width w, thickness t, length l and permittivity $\epsilon_2$ embedded in a cladding or background comprising an "infinite" homogeneous dielectric having a permittivity $\epsilon_1$.
Figure 2:
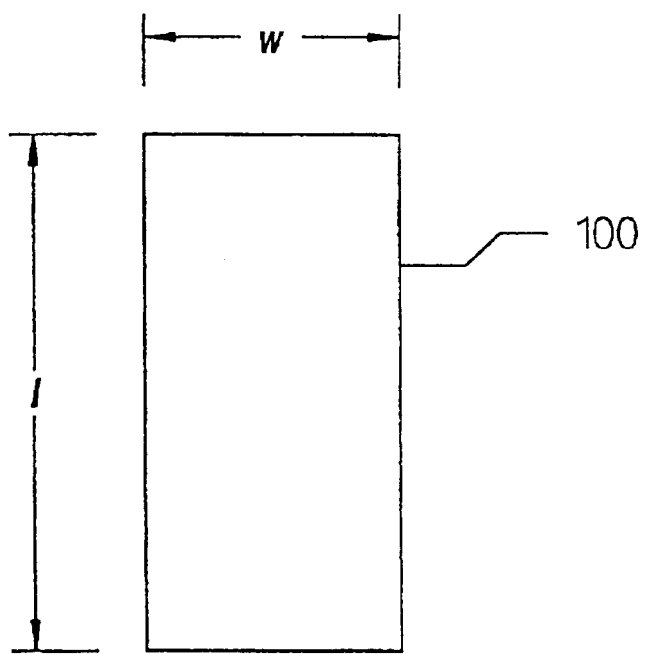
Figure 3:
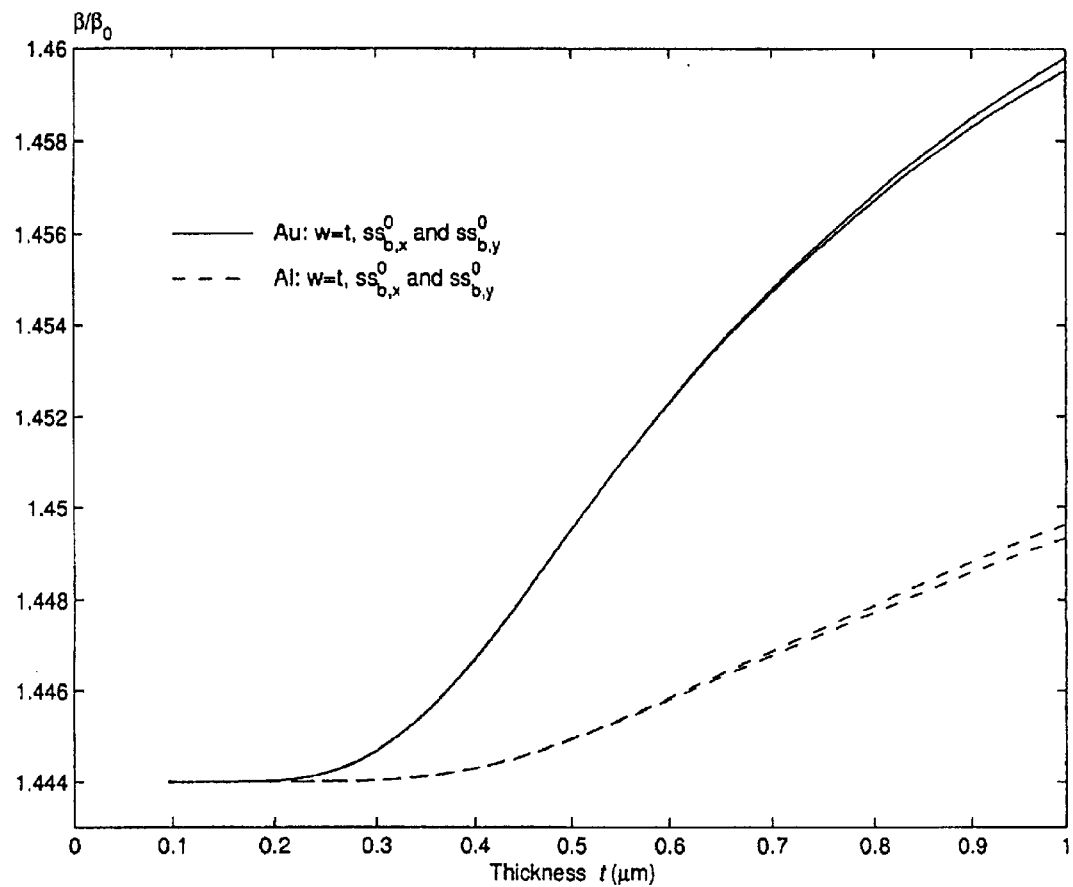
FIGS. 3(a) and 3(b) give the dispersion characteristics of the $ss_{b_x}{}^0$ and $ss_{b_y}{}^0$ modes supported by a square cross-section waveguide as a function of the waveguide cross-sectional dimension w=t for two metals of interest. (a) Normalised phase constant; (b) Attenuation.
Figure 3:
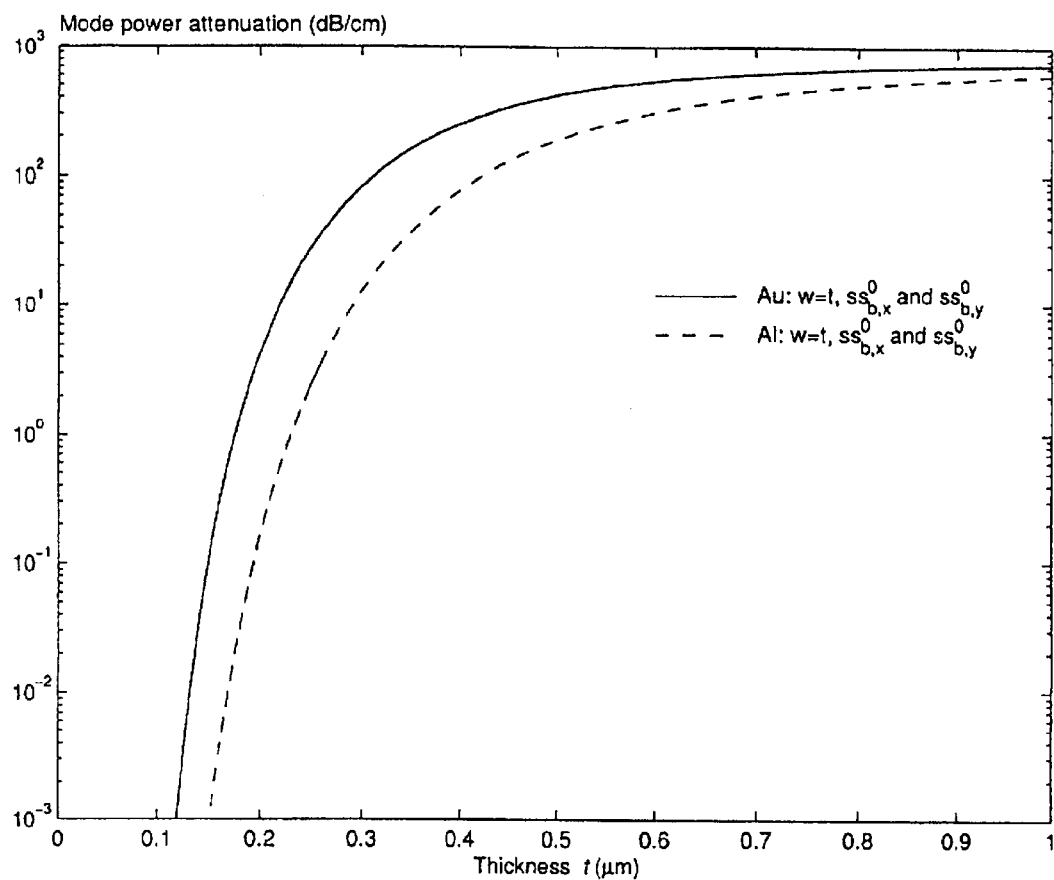

In order to facilitate an understanding of the specific optical devices embodying the invention, their theoretical basis will first be explained with reference to FIGS. 1 to 8.

The waveguide structure shown in FIG. 2(a) was analysed using the Method of Lines (MoL) applied in a manner similar to that disclosed in the afore-mentioned co-pending PCT/CA00/01525 application. The MoL is a numerical technique that can be used to solve suitably defined boundary value problems based on Maxwell's equations. The method can be used to generate the modes supported by a waveguide structure of interest. A mode is described by its mode fields and its propagation constant $\gamma = \alpha + j\beta$, where $\alpha$ is the attenuation constant and $\beta$ is the phase constant.

The square cross-section waveguide as shown in FIG. 2(a) exhibits 90° rotational symmetry about its centre longitudinal axis. A consequence of this property is that many of the modes supported by the structure are degenerate (two or more modes are said to be degenerate with respect to each other if they have identical propagation constants). In the square cross-section waveguide, two of the fundamental modes are degenerate and can be made long-ranging. One of these modes has its main transverse electric field component directed along the x axis and is denoted the $ss_{bx}^0$ mode. The other has its main transverse electric field component directed along the y axis and is denoted the $ss_{by}^0$ mode. When excited in an end-fire arrangement, a square cross-section waveguide properly dimensioned to support only these two fundamental long-ranging plasmon-polariton modes, will appear polarisation insensitive.

The physical quarter symmetry of the square cross-section waveguide structure is exploited in the MoL when solving for the modes. This is achieved by placing electric and magnetic walls along the y and x axes, respectively, of FIG. 2(a), to generate the $ss_{bx}^0$ mode, and by placing magnetic and electric walls along the y and x axes, respectively, to generate the $ss_{by}^0$ mode.

It is assumed that the metal region shown in FIG. 2(a) can be modelled as an electron gas over the wavelengths of interest. According to classical or Drude electron theory, the complex relative permittivity of the metal region is given by the well-known plasma frequency dispersion relation [4]:

$$\varepsilon_{r,2} = \left(1 - \frac{\omega_p^2}{\omega^2 + v^2}\right) - j\left(\frac{\omega_p^2 v}{\omega(\omega^2 + v^2)}\right) \quad (1)$$

where $\omega$ is be excitation frequency, $\omega_p$ is the electron plasma frequency and $v$ is the effective electron collision frequency, often expressed as $v = 1/\tau$ with $\tau$ defined as the relaxation time of electrons in the metal. Materials that are characterized by a high density of free charge carriers in general satisfy this theory; this includes metals and doped semiconductors. Such materials are often said to support a free electron gas.

FIGS. 3(a) and 3(b) show the geometrical dispersion curves computed using the MoL, of the $ss_{bx}^0$ and $ss_{by}^0$ modes supported by the square cross-section waveguide structure illustrated in FIG. 2(a), as a function of the cross-sectional dimension w=t, over the range 100 nm to 1000 nm. The optical freespace wavelength of analysis is set to $\lambda_0 = 1550$ nm and the background dielectric is $SiO_2$ ($\varepsilon_{r,1} = 2.085136$). Two cases for the metal are shown: Au ($\varepsilon_{r,2} = -131.9475 - j12.65$) and Al ($\varepsilon_{r,2} = -253.9264 - j46.08$). In FIG. 3(a), the phase constant of the modes is normalised to $\beta_0$ where $\beta_0 = \omega/c_0$, with $c_0$ being the velocity of light in free space. The mode power attenuation in dB/cm plotted in FIG. 3(b) is related to the attenuation constant $\alpha$ via:

$$\text{attenuation} = \frac{1}{100}\alpha \log(e)$$

As is seen from FIG. 3(b), the modes exhibit a vanishing attenuation as the size of the square cross-section is reduced, and both the $ss_{bx}^0$ and $ss_{by}^0$ modes remain guided down to very small values of w=t. It is noted that mode power attenuation values in the range of about 10 dB/cm down to 0.1 dB/cm are achievable using structure dimensions w=t in the range from about 280 nm down to about 150 nm for Au and Al. These are good dimensions for the waveguide.

From FIG. 3(a), it is noted that the phase constant of both the $ss_{bx}^0$ and $ss_{by}^0$ modes tends towards the phase constant of a Transverse Electro Magnetic (TEM) wave propagating in the infinite homogeneous background as the size of the square cross-section is reduced. The curves plotted in FIG. 3(a) for both of these degenerate modes should be identical but due to small residual numerical errors in the MoL, the curves are slightly different for each mode.

Figure 4:
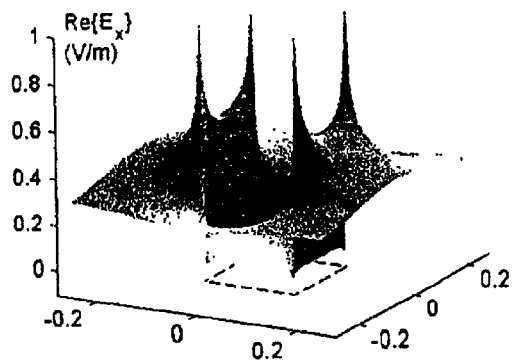
FIGS. 4(a),(b),(c),(d),(e) and (f) illustrate the spatial distribution of the six field components related to the $ss_{b_x}{}^0$ mode supported by a square cross-section metal waveguide of dimensions w=t=180 nm. The waveguide cross-section is located in the x-y plane and the metal region is outlined as the rectangular dashed contour. The field distributions are normalized such that max|Re{$E_x$}|=1.
Figure 4:
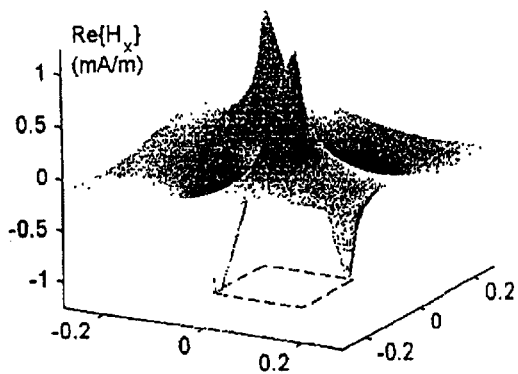
Figure 4:
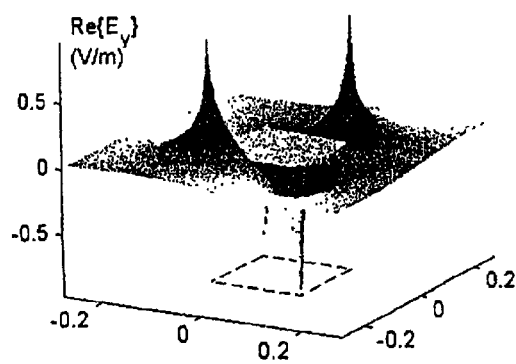
Figure 4:
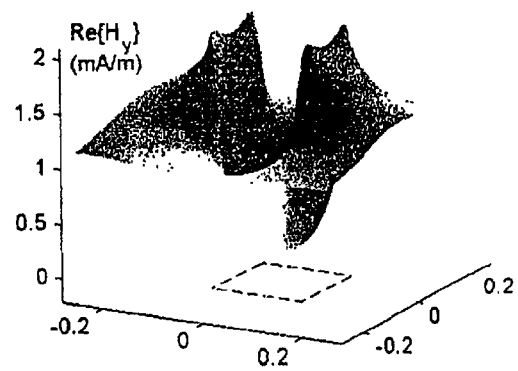
Figure 4:
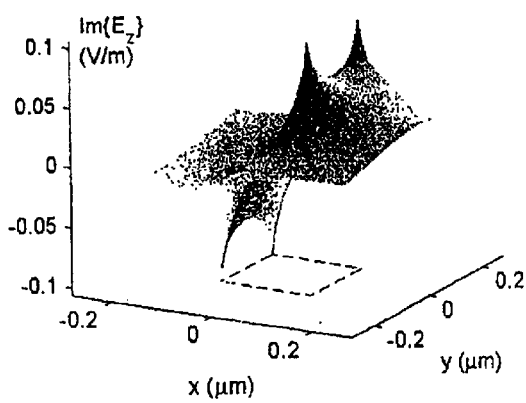
Figure 4:
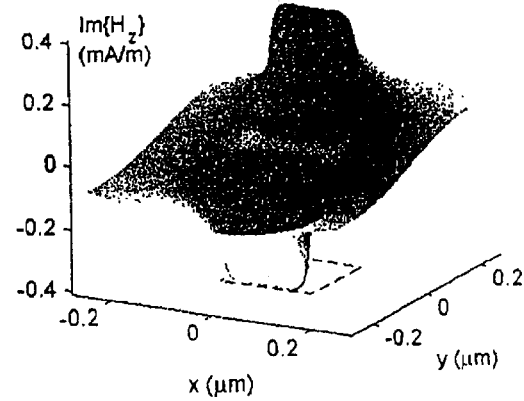
Figure 5:
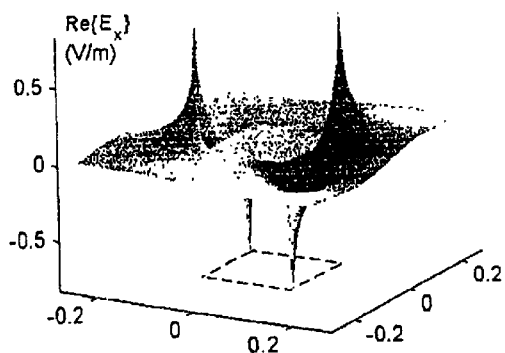
FIGS. 5(a),(b),(c),(d),(e) and (f) illustrate the spatial distribution of the six field components related to the $ss_{b_y}{}^0$ mode supported by a square cross-section metal waveguide of dimensions w=t=180 nm. The waveguide cross-section is located in the x-y plane and the metal region is outlined as the rectangular dashed contour. The field distributions are normalized such that max|Re{$E_y$}|=1.
Figure 5:
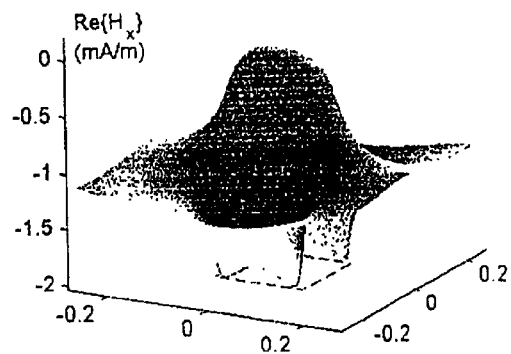
Figure 5:
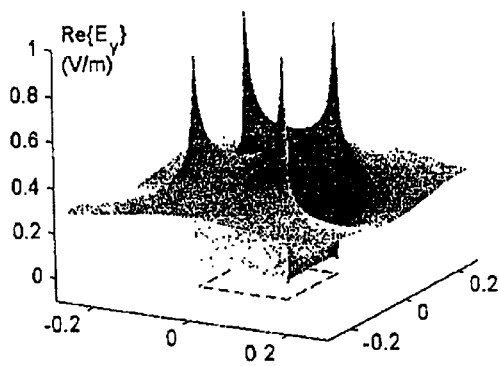
Figure 5:
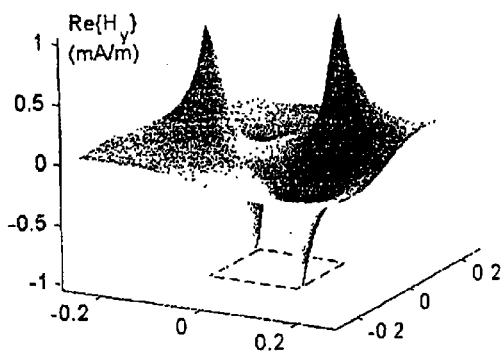
Figure 5:
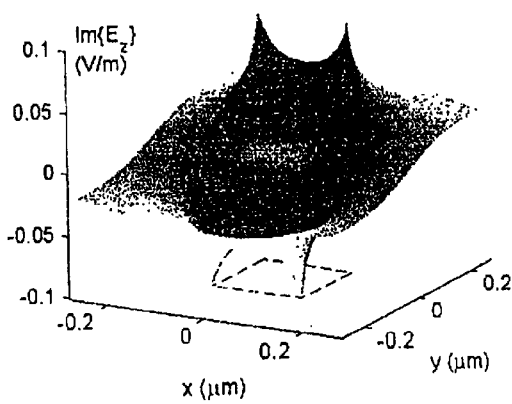
Figure 5:
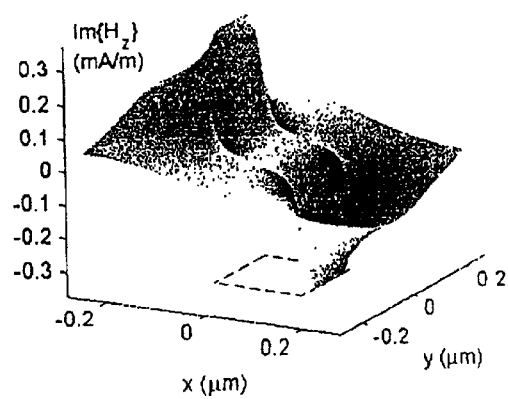

FIGS. 4 and 5 give the spatial distribution of the six field components related to the $ss_{bx}^0$ and $ss_{by}^0$ modes, respectively, for the Au core at w=t=180 nm. The waveguide cross-section is located in the x-y plane and the metal region is outlined as the rectangular dashed contour. The field distributions are normalized such that $\max|\text{Re}\{E_x\}| = 1$ and $\max|\text{Re}\{E_y\}| = 1$, respectively. From FIG. 4 it is noted that the mode power associated with the $ss_{by}^0$ mode is carried mainly by the $E_x$ and $H_y$ field components. Conversely, from FIG. 5 it is clear that the mode power associated with the $ss_{by}^0$ mode is carried mainly by the $E_y$ and $H_x$ field components. It is also observed from these figures that the fields are greatest in the region immediately surrounding the metal portion, and that they decay in an exponential-like manner away from the metal.

Observing the evolution of the fields associated with these modes as w=t is reduced, reveals that the $ss_{bx}^0$ and $ss_{by}^0$ modes indeed evolve, respectively, into the horizontally and vertically polarised TEM waves supported by the background, as the metal vanishes.

Figure 6:
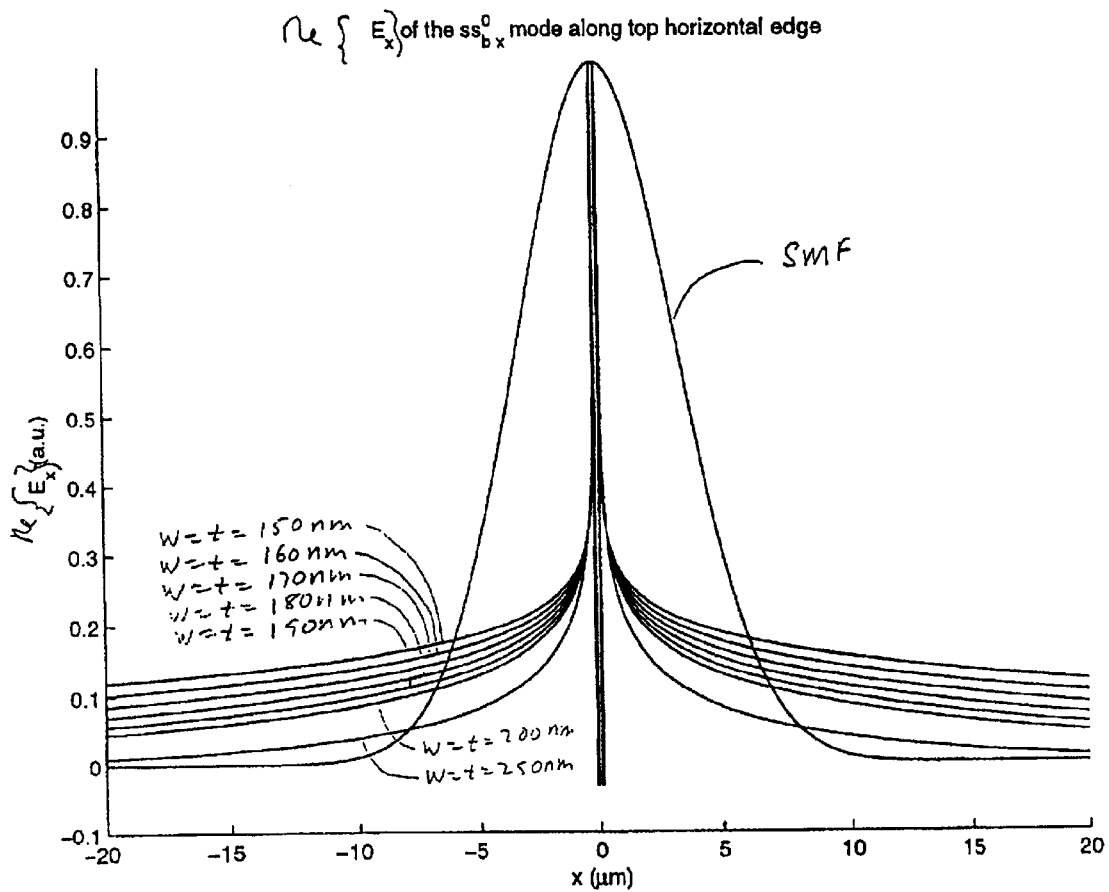
FIG. 6 shows the spatial distribution of Re{$E_x$} related to the $ss_{b_x}{}^0$ mode, plotted in the x direction along the top horizontal edge of the metal region, for waveguides having different cross-sectional dimensions. The spatial distribution of the main transverse electric field component related to the fundamental mode supported by an optical fibre is also shown for comparison.
Figure 7:
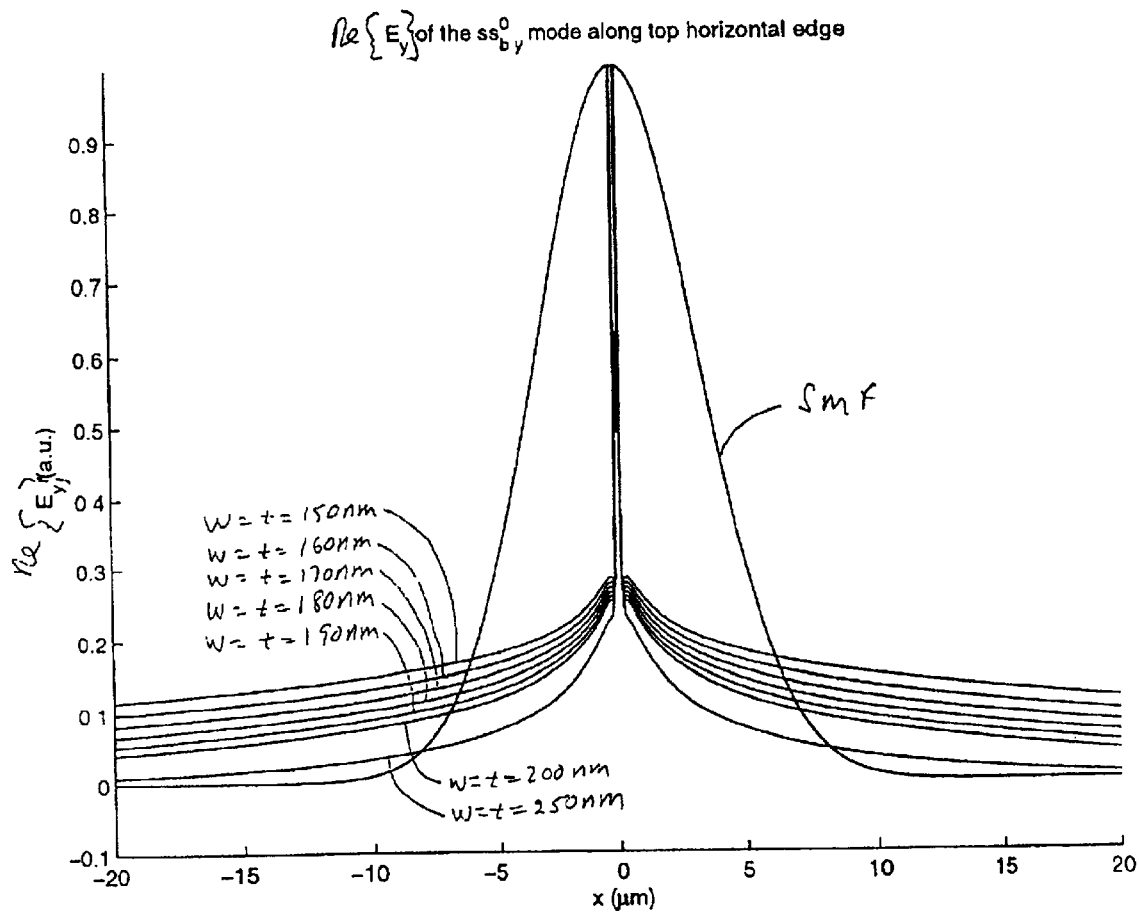
FIG. 7 shows the spatial distribution of Re{$E_y$} related to the $ss_{b_y}{}^0$ mode, plotted in the x direction along the top horizontal edge of the metal region, for waveguides having different cross-sectional dimensions. The spatial distribution of the main transverse electric field component related to the fundamental mode supported by an optical fibre is also shown for comparison.
Figure 8:
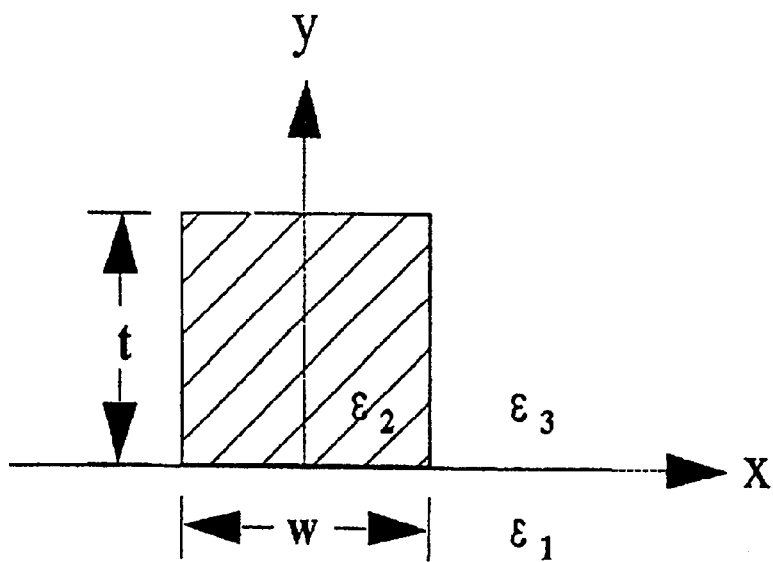
FIGS. 8(a) and 8(b) are a cross-sectional view and a plan view, respectively, of a second embodiment of the invention in the form of an asymmetric waveguide structure formed by a metal region having a substantially square cross-section of thickness t, width w and permittivity $\epsilon_2$ supported by a homogeneous semi-infinite substrate of permittivity $\epsilon_1$ and with a cover or superstrate comprising a homogeneous semi-infinite dielectric of permittivity $\epsilon_3$.
FIGS. 8(c) and 8(d) give the attenuation of the $ss_{b_x}{}^0$ and $ss_{b_y}{}^0$ modes supported by the square cross-section waveguide of FIG. 8(a) as a function of dielectric asymmetry.
Figure 8:
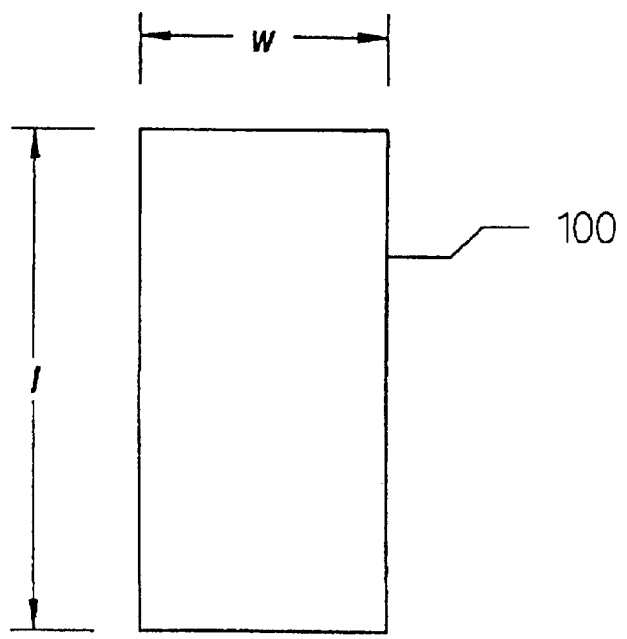
Figure 8:
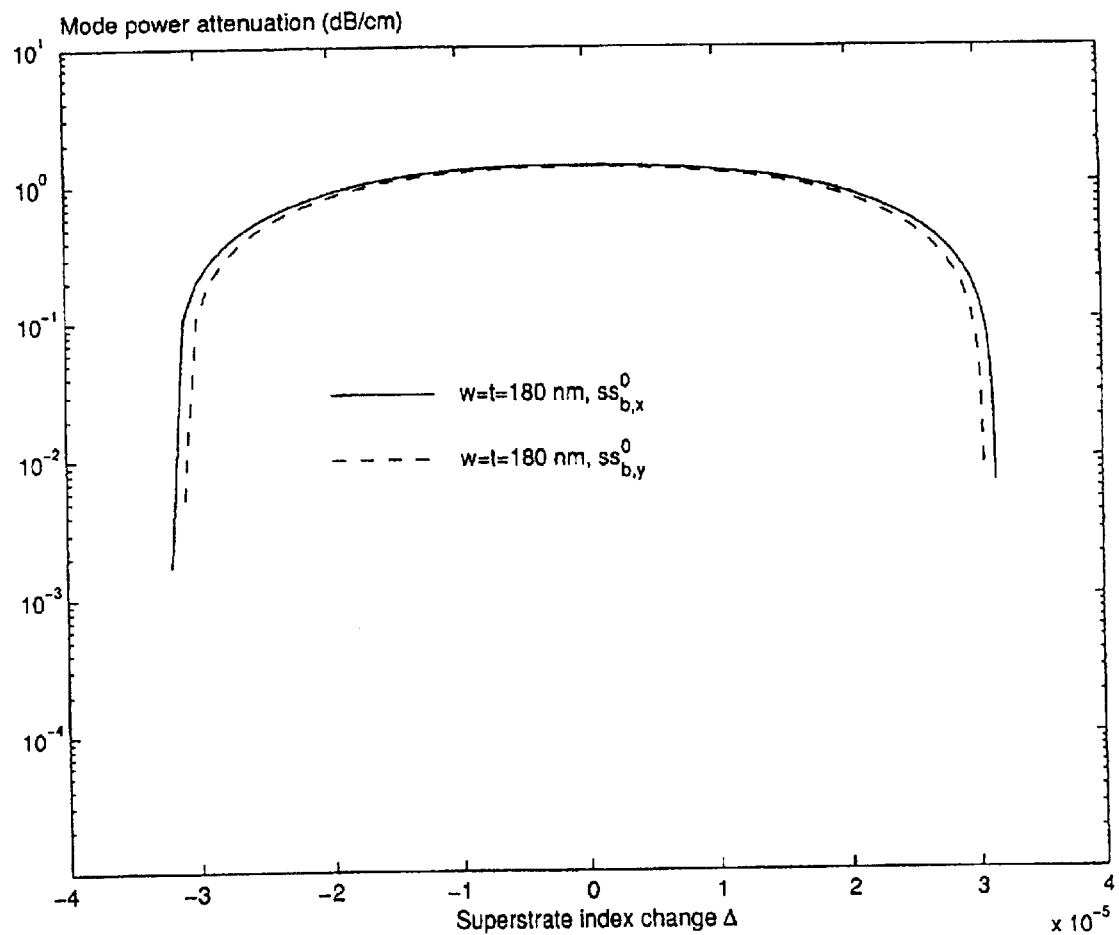
Figure 8:
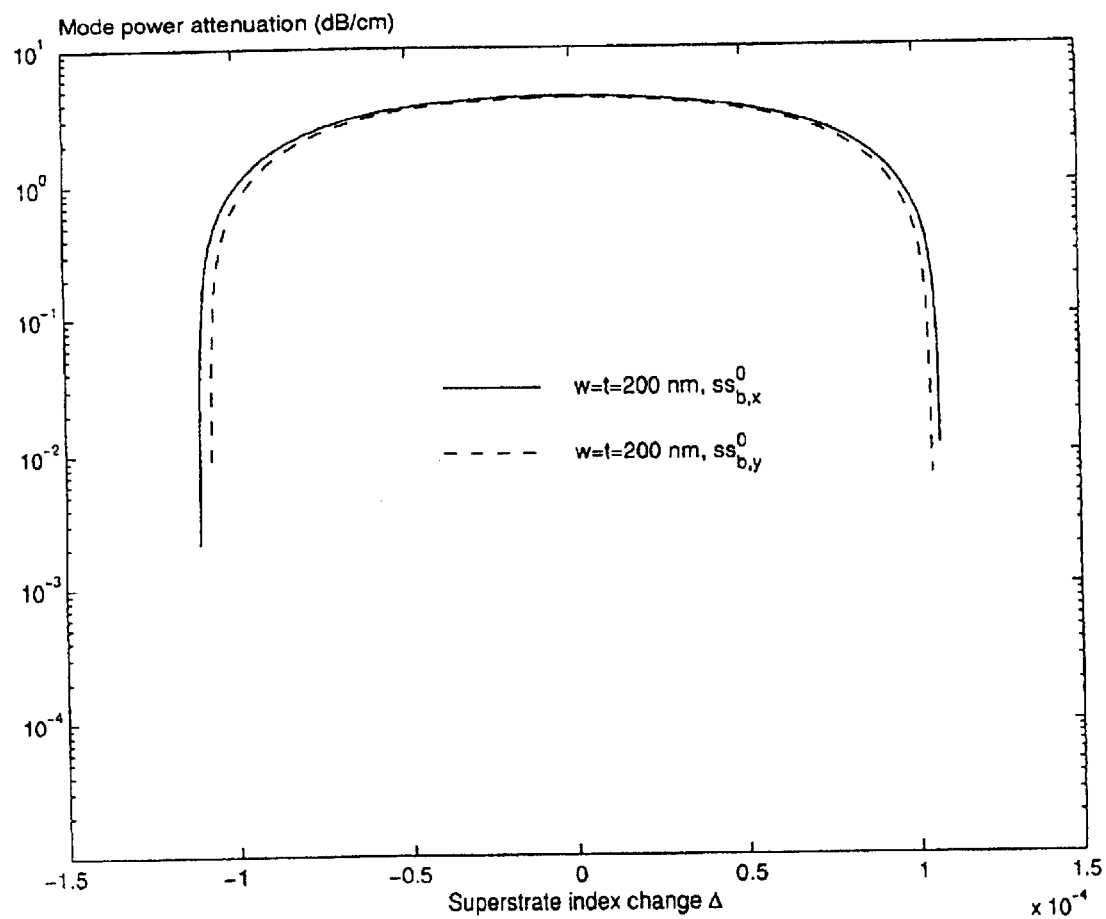

FIGS. 6 and 7 show the spatial distribution of the real part of the $E_x$ and $E_y$ field components associated with the $ss_{bx}^0$ and $ss_{by}^0$ modes, respectively, for the Au core. The distributions are plotted in the x direction along the top horizontal edge of the metal portion and they are shown for various cross-sectional dimensions. The distribution of the main transverse electric field component of the fundamental mode supported by a Single Mode Fibre (SMF) having a numerical aperture of 0.14 and a diameter of 8.2 $\mu$m is also shown on both figures for comparison. All fields are normalised to a maximum value of unity. It is noted that as the metal portion vanishes, the field distribution flattens out extending further away from the metal into the dielectric region, resembling more and more the uniform distribution of the associated TEM wave supported by the background. Metal dimensions w=t in the range of 200 to 150 nm provide reasonable confinement though it is clear that a trade-off between confinement and attenuation exists in these structures.

Table I below lists the attenuation and coupling losses to SMF of the $ss_{bx}^0$ and $ss_{by}^0$ modes supported by the square cross-section Au waveguide structure. The coupling loss L in dB is defined as:

$$L = -20 \log|C|$$

The overlap factor C in the above is defined as:

$$C = \int\int_S E_f E_g * ds$$

Where the field $E_f$ is taken as the main transverse electric field component of the fundamental fibre mode supported by a SMF (NA=0.14, dia=8.2) and the field $E_g$ is taken as being either the $E_x$ or $E_y$ field component of the $ss_{bx}^0$ and $ss_{by}^0$ modes, respectively. Before evaluation of the overlap factor, the fields are normalised such that the following hold:

$$\int\int_S E_f E_f^* ds = 1 \quad \int\int_S E_g E_g^* ds = 1$$

The above integrals are taken over S, which corresponds to the entire computational domain over which the waveguide mode fields are computed.

TABLE I: Attenuation and coupling losses to SMF of the $ss_{bx}^0$ and $ss_{by}^0$ modes supported by square cross-section Au/SiO2 waveguides at a free-space operating wavelength of 1550 nm.

| | $ss_{bx}^0$ | | | $ss_{by}^0$ | |
|---|---|---|---|---|---|
| w = t (nm) | Att. (dB/cm) | L. (dB) | w = t (nm) | Att. (dB/cm) | L. (dB) |
| 150 | 0.11 | 5.81 | 150 | 0.10 | 5.86 |
| 160 | 0.29 | 4.51 | 160 | 0.27 | 4.56 |
| 170 | 0.68 | 3.50 | 170 | 0.64 | 3.54 |
| 180 | 1.39 | 2.71 | 180 | 1.32 | 2.76 |
| 190 | 2.58 | 2.11 | 190 | 2.46 | 2.15 |
| 200 | 4.41 | 1.64 | 200 | 4.24 | 1.68 |
| 250 | 27.54 | 0.69 | 250 | 27.81 | 0.68 |

From Table I, it is observed that the coupling losses to fibre increase as the mode fields spread out further into the surrounding dielectric. For the materials considered in this example, an Au core having dimensions of about w=t=180 nm provides a reasonable compromise between attenuation, confinement and coupling losses.

Its losses decrease with decreasing cross-section and the main degenerate long-ranging modes, the $ss_{bx}^0$ and $ss_{by}^0$ modes, do not appear to have cut-off dimensions. The losses related to these modes could be made arbitrarily small though it must be considered in this example, an Au core having dimensions of about w=t=180 nm provides a reasonable compromise between attenuation, confinement and coupling losses.

Its losses decrease with decreasing cross-section and the main degenerate long-ranging modes, the $ss_{bx}^0$ and $ss_{by}^0$ modes, do not appear to have cut-off dimensions. The losses related to these modes could be made arbitrarily small though it must be remembered that a trade-off against confinement is necessary. The fields must remain reasonably well confined in order for the light to round bends of small radii.

Due to the nature of their field distributions, the $ss_{bx}^0$ and $ss_{by}^0$ modes are excitable using a simple end-fire technique similar to the one employed to excite surface plasmon-polariton modes [19,6]. This technique is based on maximising the overlap between the incident field and that of the mode to be excited. In reference [22], the present inventor et al. disclosed that plasmon-polariton waves supported by thin metal films of finite width had been observed experimentally at optical communications wavelengths using this method of excitation. Advantageously in the case of the square cross-section waveguides, the polarisation of the incident light field does not need to be oriented in any particular direction.

In FIG. 8(a) the square cross-section metal region is supported by a semi-infinite homogeneous substrate of permittivity $\epsilon_1 = n_1^2$ and covered by a different semi-infinite homogeneous dielectric of permittivity $\epsilon_3 = n_3^2$, where $n_1$ and $n_2$ are the refractive indices of the dielectrics. Introducing such an asymmetry into the structure can break the degeneracy of the $ss_{bx}^0$ and $ss_{by}^0$ modes. If the asymmetry is small, about $|\epsilon_1 - \epsilon_3| \approx 10^{-3}$, then the $ss_{bx}^0$ and $ss_{by}^0$ modes will remain long-ranging as w=t is reduced but cut-off dimensions below which purely bound propagation will not occur, are introduced. As the asymmetry $|\epsilon_1 - \epsilon_3|$ increases, the cut-off dimensions also increase.

FIGS. 8(c) and 8(d) show the attenuation of the $ss_{bx}^0$ and $ss_{by}^0$ modes as the asymmetry in the structure depicted in FIG. 8(a) is increased. The metal selected is Au, and the wavelength of analysis is set to $\lambda_0 = 1550$ nm. In FIG. 8(c), a square cross-section of $\omega = t = 180$ nm is used while in FIG. 8(d) a square cross-section of $\omega = t = 200$ nm is used. FIGS. 8(c) and (d) were generated for the case $\epsilon_1 = (1.444)^2$ and $\epsilon_3 = (1.444 \pm \Delta)^2$. From these Figures, it is observed that the attenuation vanishes as the degree of asymmetry increases. This is due to the decreasing confinement of the mode. As the asymmetry increases, the mode fields spread out more and more from the metal core, and eventually all light is lost to radiation in the background dielectrics. It is noted for the geometry analysed, that the mode can be "cut-off" by inducing (electro-optically or otherwise) a modest asymmetry ($\Delta \approx 0.5 \times 10^{-4}$) to $1.5 \times 10^{-4}$ in the dielectrics surrounding the metal.

The long-ranging modes supported by the square cross-section waveguide are quite sensitive to the asymmetry in the structure. This high sensitivity is useful as a small induced asymmetry (created via an electro-optic effect present in the dielectrics say) can effect a large change in the propagation characteristics of the long-ranging modes. This physical phenomenon forms the basis of some of the device architectures described herein.

The existence of the long-ranging $ss_{bx}^0$ and $ss_{by}^0$ modes in a symmetric structure makes the square cross-section metal waveguide attractive for applications requiring short propagation distances. The waveguide is polarisation independent and offers two-dimensional field confinement in the transverse plane, rendering it useful as the basis of an integrated optics technology. Interconnects, power splitters, power couplers, interferometers and other integrated optics components could be built using the guides. Finally, the structures are quite simple and are inexpensive to fabricate.

Sample analysis results describing the operation of the invention are shown in FIGS. 3 to 8 assuming an operating free-space wavelength of $\lambda_0=1550$ nm. This wavelength was selected as an example due to its widespread use for optical fibre communications and it is not intended to limit the application of the invention to this wavelength. Indeed, the invention can be used over a very broad wavelength range from the visible $\lambda_0$ ~500 nm to the infra-red $\lambda_0$ ~10 μm.

For operation at a wavelength of about 500 nm, width and thickness of about 40 nm to about 70 nm give good performance. For operation at a wavelength of about 10,000 nm, width and thickness of about 500 nm to about 2000 nm give good performance.

SPECIFIC EMBODIMENTS AND EXAMPLES OF APPLICATION

Examples of practical waveguide structures, and integrated optics devices which can be implemented using the invention, will now be described with reference also to FIGS. 9 to 30. Unless otherwise stated, where a waveguide structure is shown, it will have a general construction similar to that shown in FIGS. 2(a) and 2(b) or that shown in FIGS. 8(a) and 8(b), with w=t or w≈t.

The waveguide structure 100 shown in FIGS. 2(a) and 2(b) comprises a strip of finite thickness t and width w of a first material having a high free (or almost free) charge carrier density, surrounded by a second material which has a very low free carrier density. The strip material can be a metal or a highly doped semiconductor and the background material can be a dielectric. The strip has a substantially square cross-section w=t.

Suitable materials for the strip include (but are not limited to) gold, silver, copper, aluminium and highly n- or p-doped GaAs, InP or Si, while suitable materials for the surrounding material include (but are not limited to) glass, quartz, polymer and undoped or very lightly doped GaAs, InP or Si. Particularly suitable combinations of materials include Au for the strip and $SiO_2$ for the surrounding material.

The thickness t and the width w of the strip are selected equal and small enough such that the waveguide supports two degenerate orthogonally polarised long-ranging plasmon-polariton modes at the free-space operating wavelength of interest. Suitable dimensions for Au/$SiO_2$ waveguides at an operating free-space wavelength of 1550 nm are about w=t=150 nm to w=t=200 nm.

FIG. 3(b) gives the mode power attenuation for waveguides constructed from strips of gold (Au) or Aluminium (Al) embedded in silicon dioxide ($SiO_2$) for various widths and thicknesses w=t of the metal strip. Analyses were carried out with an optical free space wavelength of 1550 nm. The curves show that very low attenuation values can be obtained with metal strips of practical dimensions. The case w=t=180 nm are good dimensions for the Au/$SiO_2$ waveguides, providing a reasonable trade-off between confinement and attenuation. The case w=t=240 nm are good dimensions for the Al/$SiO_2$ waveguides, providing a reasonable trade-off between confinement and attenuation.

Unless otherwise stated when structure dimensions are mentioned from this point onward, they refer to the square cross-section Au waveguides embedded in $SiO_2$ at an operating optical free-space wavelength of 1550 nm. Similar dimensions are needed for most material combinations.

The plasmon-polariton field may be excited by optical radiation coupled to the strip in an end-fire manner from a fiber butt-coupled to the input of the waveguide. The output of the waveguide can also be butt-coupled to a fibre. Alternatively, the waveguide could be excited at an intermediate position by an alternative means, for example using the so-called attenuated total reflection method (ATR).

The length l shown in FIG. 2(b) is arbitrary and will be selected to implement a desired interconnection. It has been demonstrated that a straight waveguide 100 with the square cross-sectional dimensions set out above is low-loss and polarisation insensitive.

Figure 10:
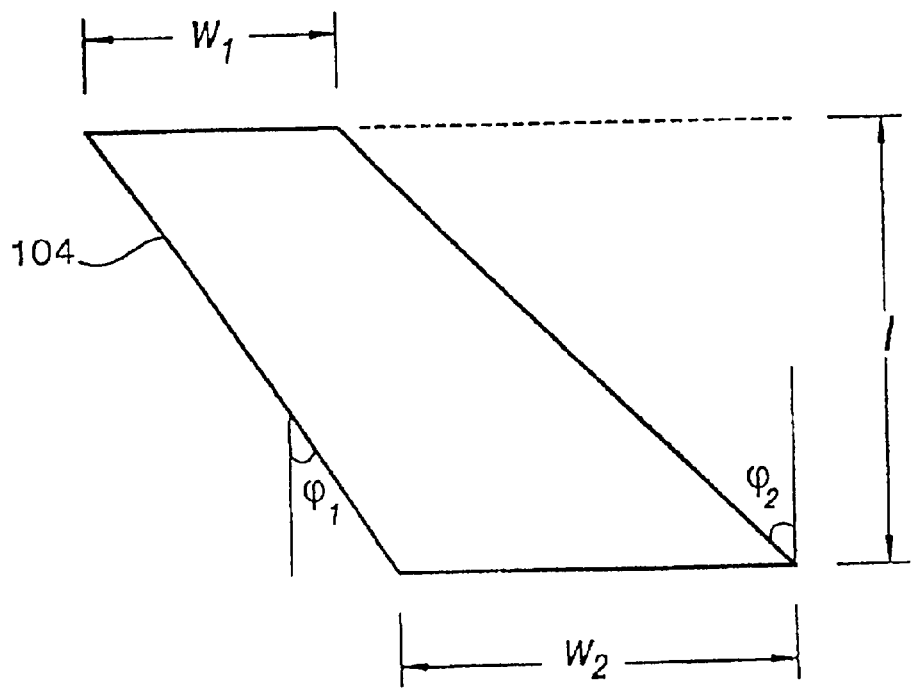
FIG. 10 is a plan view of a waveguide which is tapered and slanted.

FIG. 10 shows an angled section 104 which can be used as an interconnect or transition. Its dimensions, $W_1$, $W_2$ and l and the angles $\phi_1$ and $\phi_2$, are adjusted for a particular application as needed. Usually the angles are kept small, in the range of 1 to 15 degrees and the input and output widths are usually similar. Although the sides of the angled section 104 shown in FIG. 10 are tapered, they could be parallel. It should also be appreciated that the angle of the inclination could be reversed, i,e. the device could be symmetrical about the bottom right hand corner shown in FIG. 10 or transposed about that axis if not symmetrical about it. The widths $W_1$ and $W_2$ are maintained approximately equal to t, such that the element is comprised of a substantially square cross-section waveguide.

Figure 11:
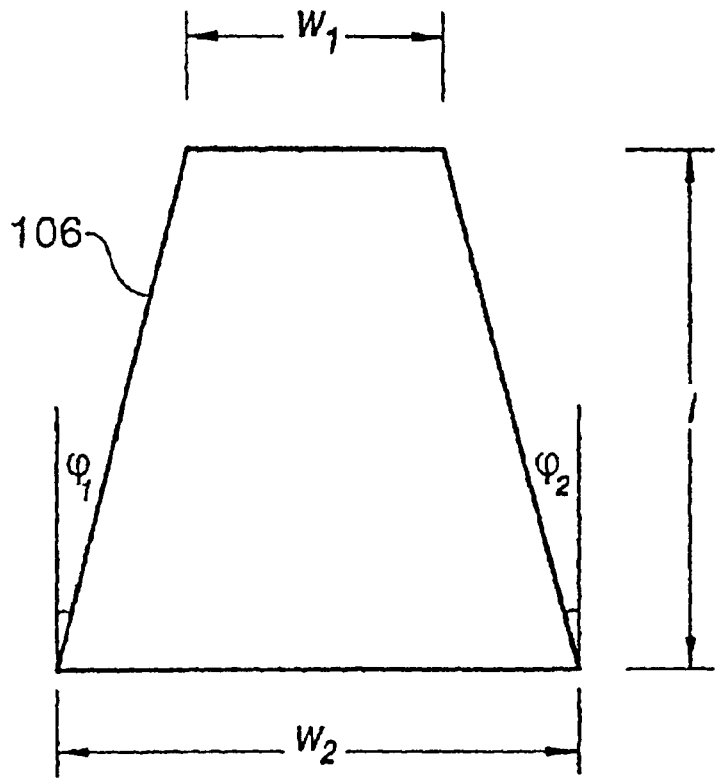
FIG. 11 is a plan view of a trapezoidal waveguide.

FIG. 11 shows a tapered transition waveguide section 106, which can be used to interconnect two waveguides of different widths. The length of the taper is usually adjusted such that the angles are small, usually in the range of 1 to 15 degrees. The taper angles at the two sides are not necessarily the same. Such a configuration might be used as an input port, perhaps as an alternative to the layout shown in FIG. 9, or as part of another device, such as a power splitter. Taper profiles other than linear (as shown) could be used, such as exponential, parabolic or sinusoidal The widths $W_1$ and $W_2$ are maintained approximately equal to t. Any symmetry of the structure shown can be used.

Figure 12:
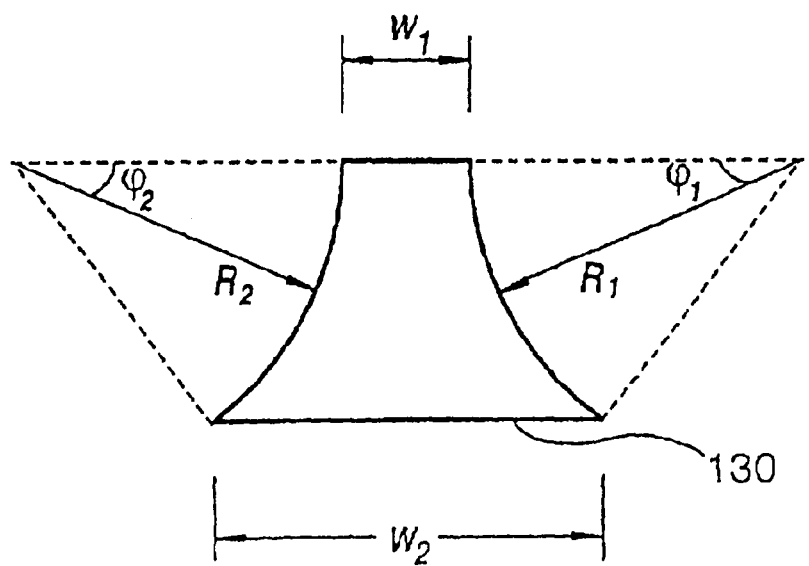
FIG. 12 is a plan view of a waveguide having curved side edges and suitable for use as a transition piece.

FIG. 12 illustrates an alternative transition waveguide section 130 which has curved sides, rather than straight as in the trapezoidal transition section disclosed in FIG. 11. In FIG. 12, the curved sides are shown as sections of circles of radius $R_1$ and $R_2$, subtending angles $\phi_1$ and $\phi_2$ respectively, but it should be appreciated that various functions can be implemented, such as sinusoidal, exponential or parabolic. The widths $W_1$ and $W_2$ are maintained approximately equal to t.

Any of the transition waveguide structures shown in FIGS. 9, 10, 11 and 12 could be used in a splitter/combiner, as will be described later.

Figure 13:
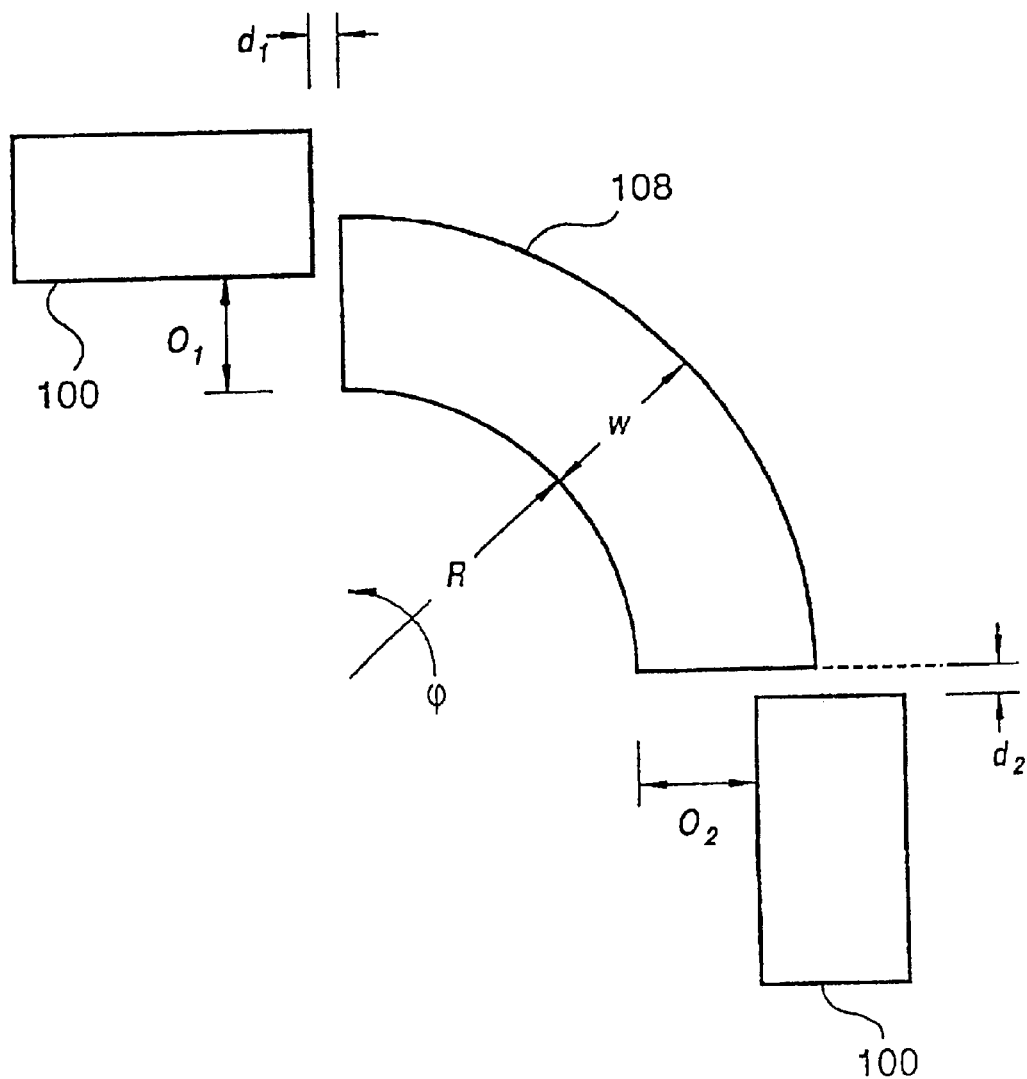
FIG. 13 is a plan view of a curved waveguide section suitable for interconnecting waveguides at a corner.

FIG. 13 shows a curved substantially square cross-section waveguide section 108 which can be used to redirect the plasmon-polariton wave. The angle $\phi$ of the bend can be in the range of 0 to 360 degrees and the bending radius R can be in the range of a few microns to a few centimeters. For a 45-degree bend, a radius of 0.5 to 2 cm is appropriate. The critical dimensions are the radius R and the positions of the input and output straight sections 100 of substantially square cross-section waveguide. Although the device will work, and the structure 108 will convey the plasmon-polariton wave around the bend, there is leakage out of the bend (from the exterior curve) and also reflection back in the direction from which the wave came. Reduced radiation and reflection is obtained when the input and output waveguides 100 are offset outwards relative to the ends of the bend. The reason for this is that the straight waveguide sections 100 have an optical field extremum that peaks along the longitudinal centre line, and then decays towards the edges. In the bend, the extremum of the optical field distribution shifts towards the exterior of the curve. This results in increased radiation from the external edge of the curve and increased reflection back to the input waveguide 100 due to a mismatch in the field distributions. Offsetting the input and output waveguides 100 towards the outside of the curve aligns the extrema of their optical fields more closely with that of the optical field in the curved section 108, which helps to reduce, even minimise both the radiation and the reflection. The tighter the radius R, the greater the radiation from the exterior of the curve, so the offset $O_1$ is related to the radius R and the optimum values would have to be determined according to the specific application It should also be noted that it is not necessary to connect the input and output waveguides 100 directly to the curve. As shown in FIG. 13, it is possible to have a short spacing $d_1$ between the end of the input waveguide 100 and the adjacent end of the curved section 108. Generally speaking, that spacing $d_1$ should be minimised, even zero, and probably no more than a few optical wavelengths. A similar offset $O_2$ and spacing $d_2$ could be provided between the bend 108 and the output straight waveguide 100.

Although FIG. 13 shows no gradual transition between the straight waveguides 100 at the input and output and the ends of the curved section 108, it is envisaged that, in practice, a more gradual offset could be provided so as to reduce edge effects at the corners.

Figure 14:
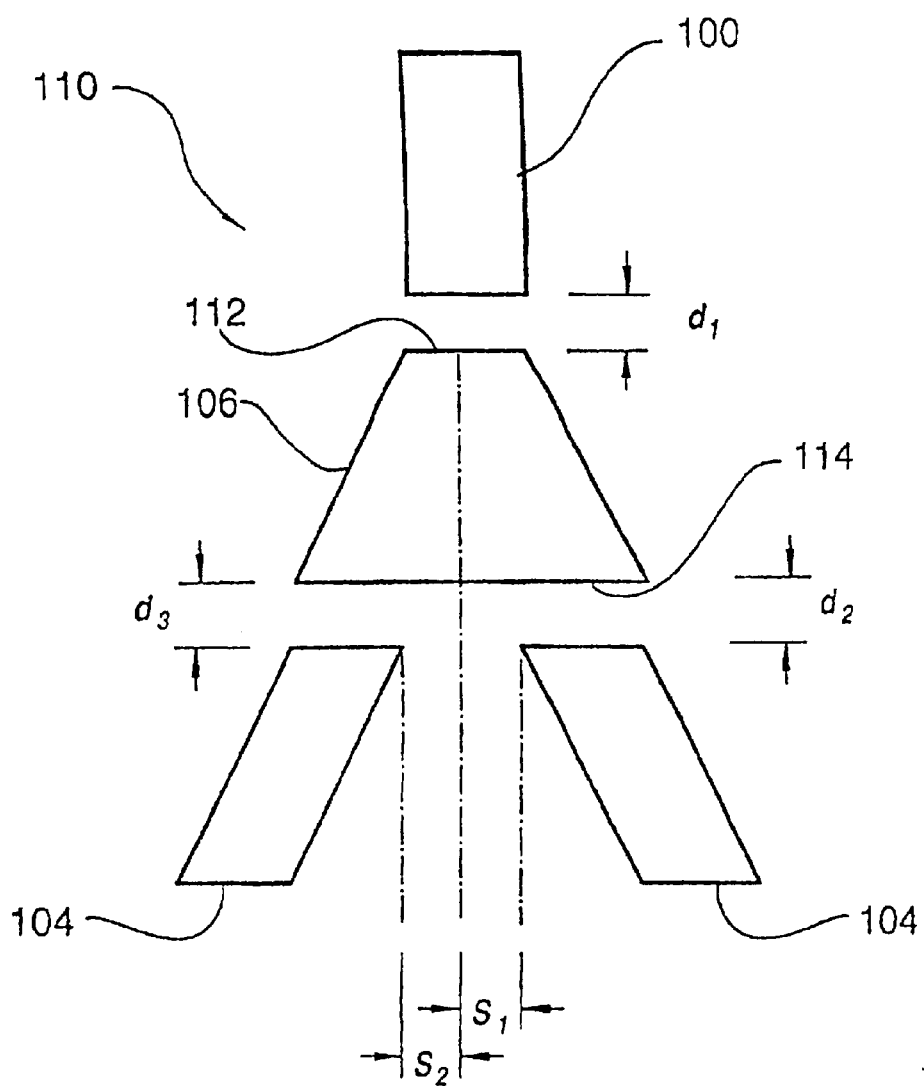
FIG. 14 is a plan view of a two-way splitter/combiner formed by a combination of three straight waveguide sections and one tapered waveguide section.

FIG. 14 shows a two-way power splitter 110 formed from a trapezoidal section 106 with a straight substantially square cross-section waveguide section 100 coupled to its narrower end 112 and two angled substantially square cross-section waveguide sections 104 coupled side-by-side to its wider end 114. The distances between the input waveguide 100 and the narrower end 112 of the tapered section 106, and between the output waveguides 104 and the wider end 114 of the tapered section 106, $d_1$, $d_2$ and $d_3$, respectively, should be minimised. The angle between the output waveguides 104 is usually in the range of 0.5 to 10 degrees and their widths are usually similar. The offsets $S_1$ and $S_2$ between the output waveguides and the longitudinal centre line of the trapezoidal section 106 preferably are set to zero, but could be non-zero, if desired, and vary in size. Ideally, however, the output sections 104 should together be equal in width to the wider end 114.

Offset $S_1$ need not be equal to offset $S_2$ but it is preferable that both are set to zero. The widths of the output sections 104 can be adjusted to vary the ratio of the output powers. The dimensions of the centre tapered section 106 are usually adjusted to minimise input and output reflections and radiation losses in the region between the output sections 104.

It should also be noted that the centre tapered section 106 could have angles that vary according to application and need not be symmetrical.

Figure 9:
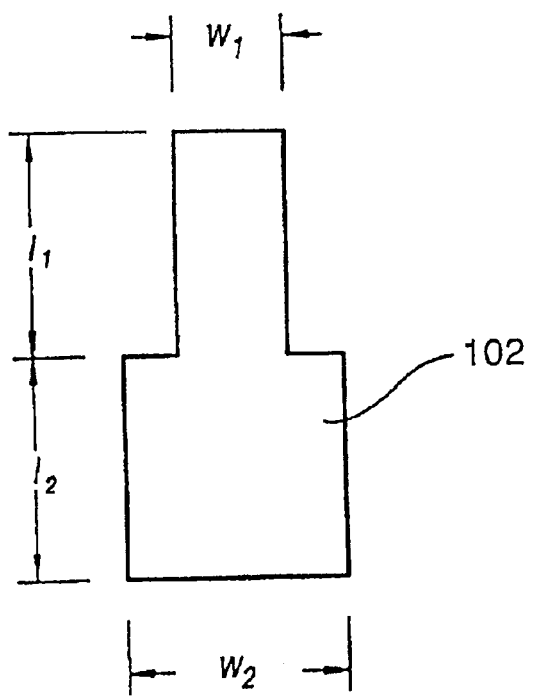
FIG. 9 is a plan view of a waveguide with opposite sides stepped to provide different widths.

Moreover, any of the alternative transition waveguide structures shown in FIGS. 9, 10 and 12 could be substituted.

It is envisaged that the tapered section 106 could be replaced by a rectangular transition section having a width broader than the width of the input waveguide 100 so that the transition section favoured multimode propagation causing constructive/destructive interference patterns throughout its length. The length could be selected so that, at the output end of the rectangular transition section, the constructive portions of the interference pattern would be coupled into the different waveguides establishing, in effect, a 1-to-N power split. Such a splitter then would be termed a multimode interferometer-based power divider.

It should be appreciated that the device shown in FIG. 14 could also be used as a combiner. In this usage, the light would be injected into the waveguide sections 104 and combined by the tapered centre section 106 to form the output wave which would emerge from the straight waveguide section 100.

In either the Y splitter or the interferometer-based power divider, the number of arms or limbs 104 at the output could be far more than the two that are shown in FIG. 14.

It is also feasible to have a plurality of input waveguides. This would enable an N×N divider to be constructed. The dimensions of the transition section 106 then would be controlled according to the type of splitting/combining required.

Figure 15:
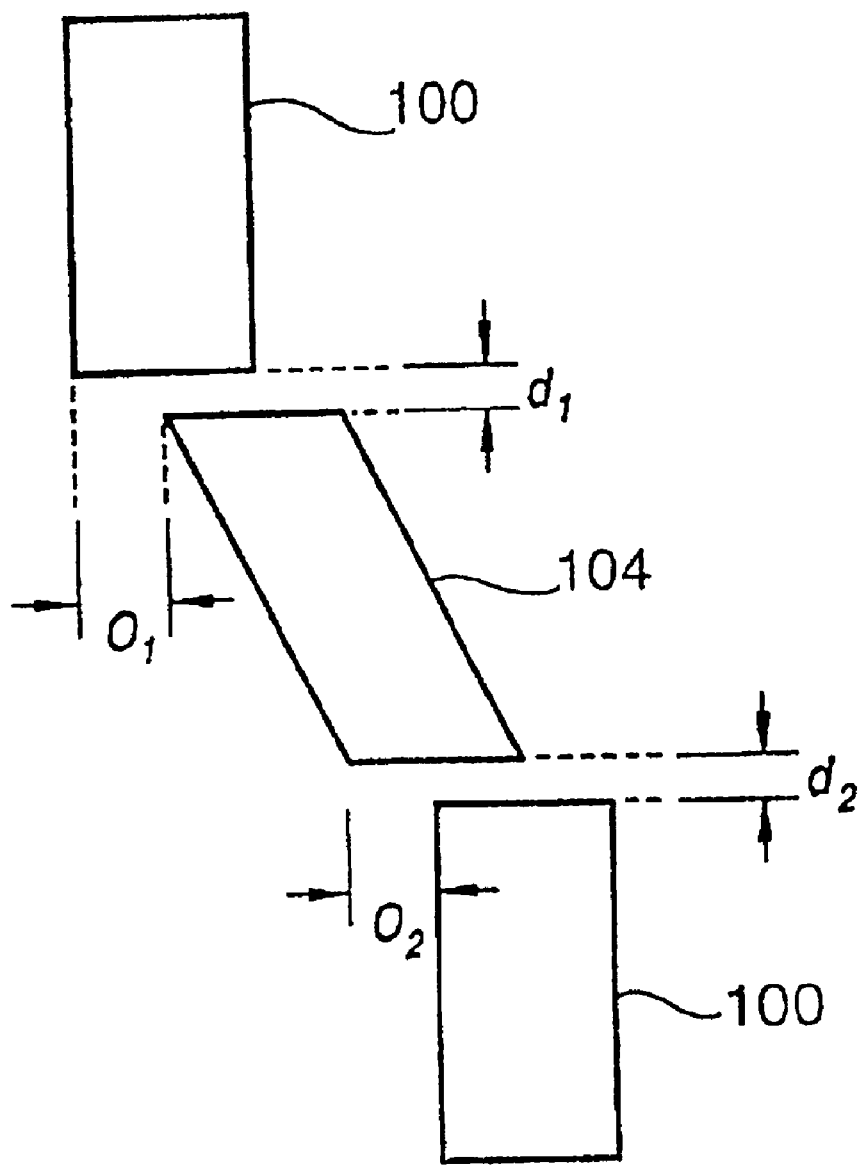
FIG. 15 is a plan view of an angled junction using a slanted section.

As shown in FIG. 15, an angled substantially square cross-section waveguide section 104 may be used to form an intersection between two straight substantially square cross-section waveguide sections 100, with the dimensions adjusted for the particular application. It should be noted that, as shown in FIG. 15, the two straight sections 100 are offset laterally away from each other by the distances $O_1$ and $O_2$, respectively, which would be selected to optimise the couplings by reducing radiation and reflection losses, in the manner discussed with reference to FIG. 13. The angle of the trapezoidal section 104 will be a factor in determining the best values for the offsets $O_1$ and $O_2$. The sections 100 and 104 need not be connected directly together, but could be spaced by the distances $d_1$ and $d_2$ and/or coupled by a suitable transition piece that would make the junction more gradual (i,e., the change of direction would be more gradual).

The embodiments of FIGS. 13 and 15 illustrate a general principle of aligning optical fields, conveniently by offsets, wherever there is a transition or change of direction of the optical wave and an inclination relative to the original path, which can cause radiation and reflection if field extrema are misaligned. Such offsets would be applied whether the direction-changing sections were straight or curved.

Figure 16:
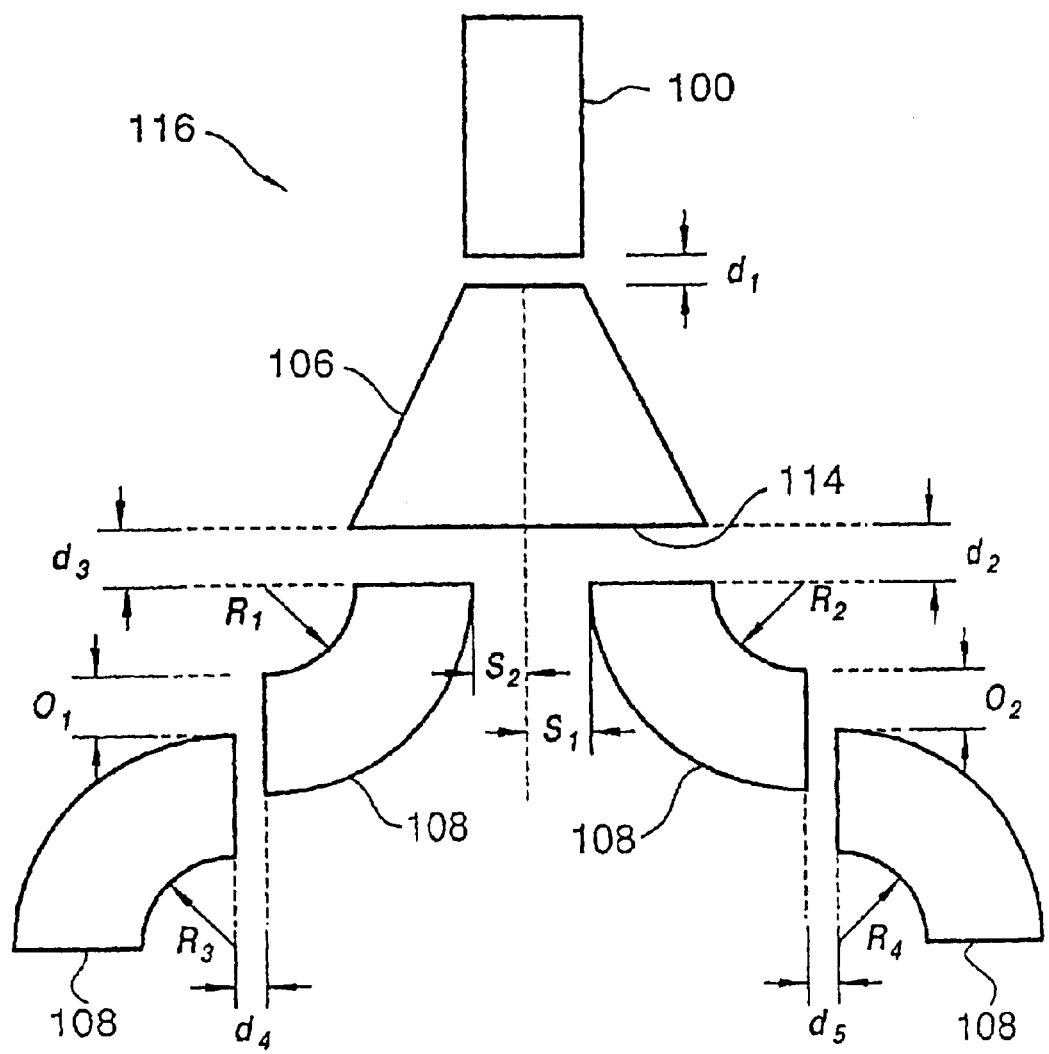
FIG. 16 is a plan view of a power divider formed by a trapezoidal section and pairs of concatenated bends.

As illustrated in FIG. 16, a power divider 116 can also be implemented using a pair of concatenated curved sections 108 instead of each of the angled sections 104 in the splitter 110 shown in FIG. 14. As shown in FIG. 16, in each pair, the curved section nearest to the wider end 114 of the tapered section 106 curves outwards from the longitudinal centre line of the tapered section 106 while the other curved section curves oppositely so that they form an "S" bend. Also, the curved sections in each pair are offset by distance $O_1$ or $O_2$ one relative to the other for the reasons discussed with respect to the bend 108 shown in FIG. 13. Other observations made regarding the power divider and the curved section disclosed in FIGS. 13 and 14 respectively, also hold in this case.

Figure 17:
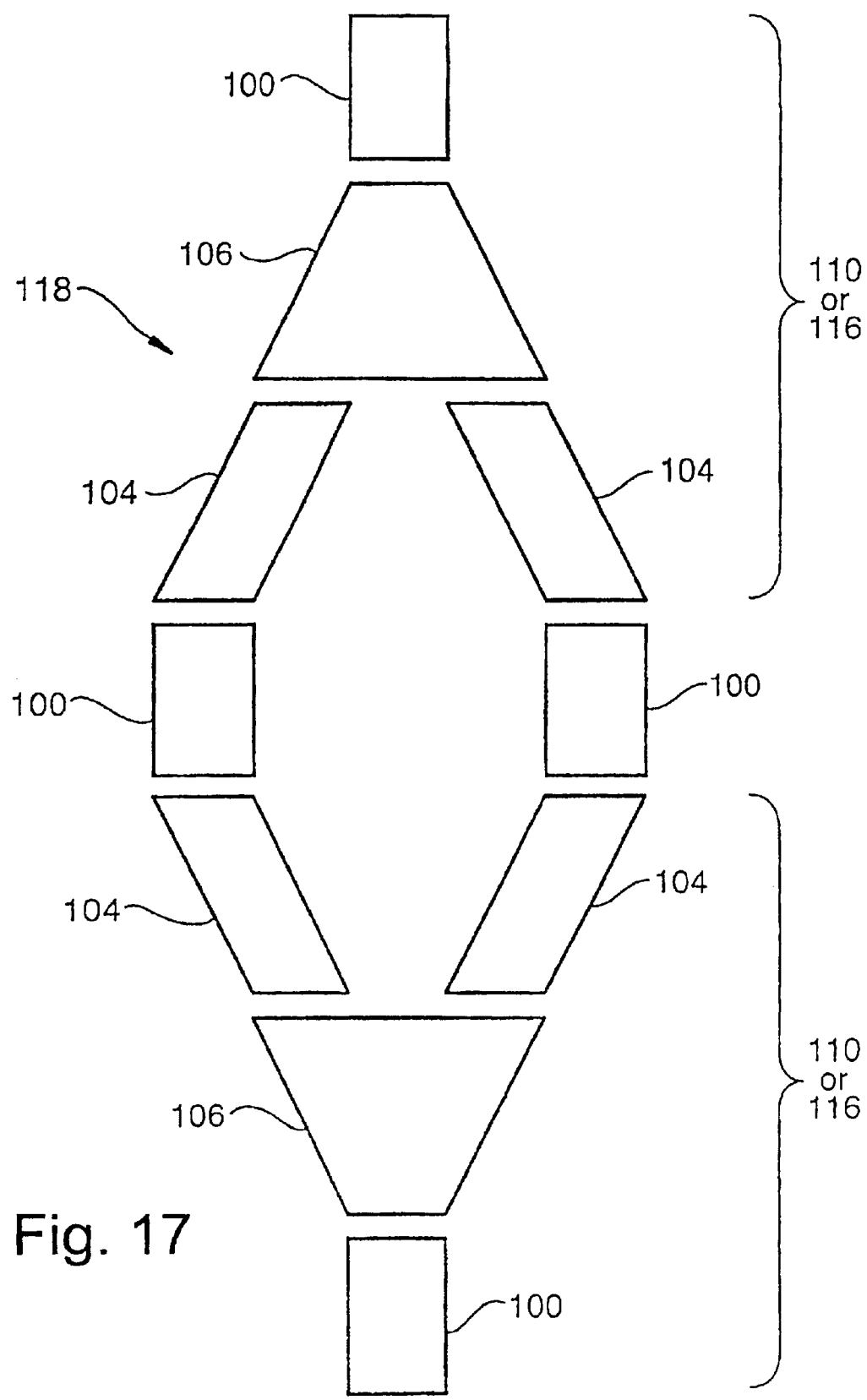
FIG. 17 is a plan view of a Mach-Zehnder interferometer formed using a combination of the waveguide sections.
Figure 18:
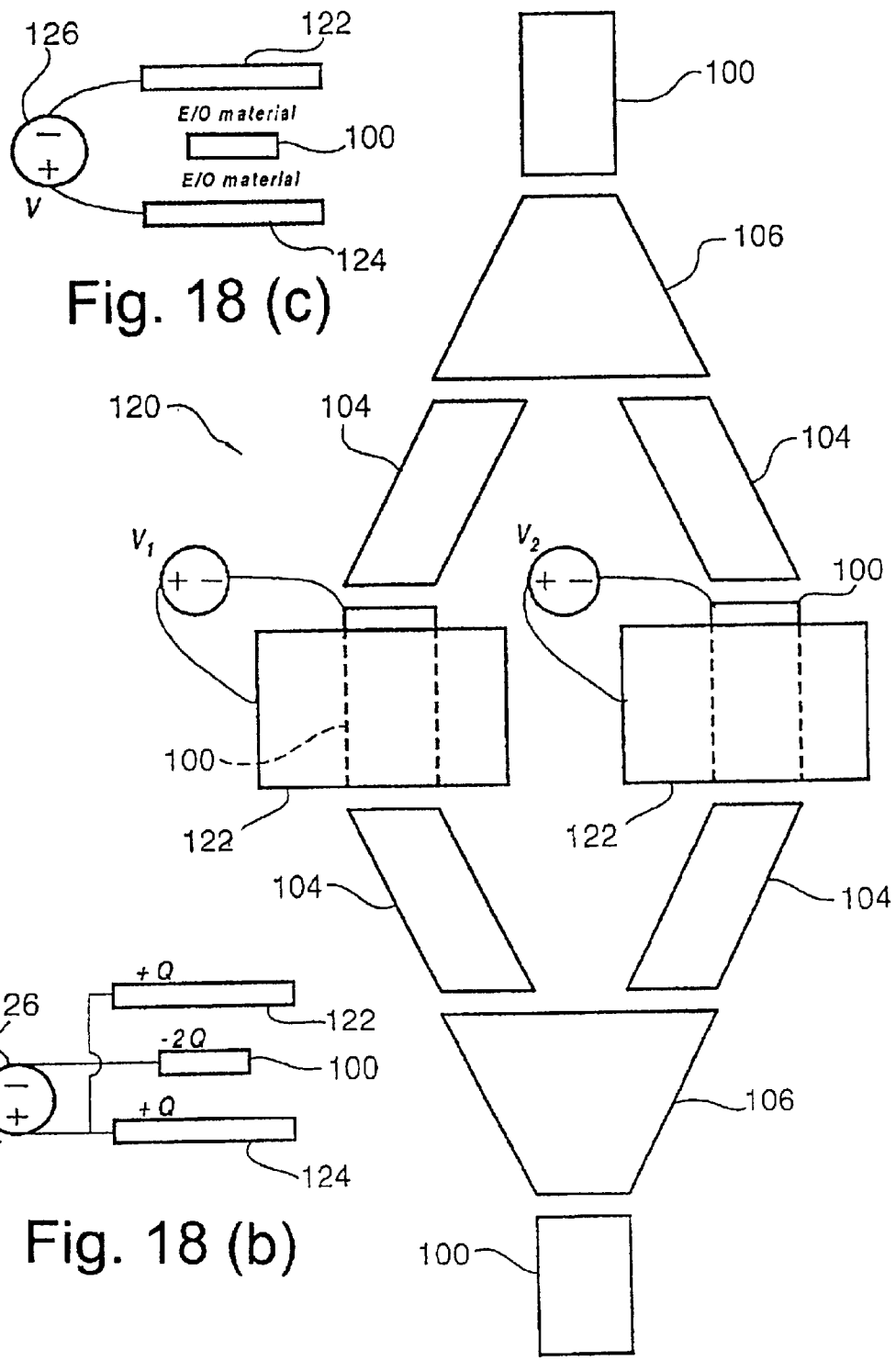
FIG. 18(a) is a schematic plan view of a modulator using the Mach-Zehnder waveguide structure of FIG. 17.
FIGS. 18(b) and 18(c) are inset diagrams illustrating alternative ways of applying a modulation control voltage.

FIG. 17 illustrates a Mach-Zehnder interferometer 118 created by interconnecting two power splitters 110 as disclosed in FIG. 14, Of course, either or both of them could be replaced by the power splitter 116 shown in FIG. 16. Light injected into one of the ports, i.e. the straight section 100 of one power splitter 110/116, is split into equal amplitude and phase components that travel along the angled arms 104 of the splitter, are coupled by straight sections 100 into the corresponding arms of the other splitter, and then are recombined to form the output wave.

If the insertion phase along one or both arms of the device is modified, then destructive interference between the re-combined waves can be induced. This induced destructive interference is the basis of a device that can be used to modulate the intensity of an input optical wave. The lengths of the arms 100 are usually adjusted such that the phase difference in the re-combined waves is 180 degrees for a particular relative change in insertion phase per unit length along the anus. The structure will thus be long if the mechanism used to modify the per unit length insertion phase is weak (or short if the mechanism is strong).

FIG. 18(a) illustrates a modulator 120 based on the Mach-Zehnder 118 disclosed in FIG. 17. As illustrated also in FIG. 18(b), parallel plate electrodes 122 and 124 are disposed above and below, respectively, each of the strips 100 which interconnects two angled sections 104, and spaced from it, by the dielectric material, at a distance large enough that optical coupling to the electrodes is negligible. The electrodes are connected in common to one terminal of a voltage source 126, and the intervening strip 100 is such that the phase difference in the re-combined waves is 180 degrees for a particular relative change in insertion phase per unit length along the arms. The structure will thus be long if the mechanism used to modify the per unit length insertion phase is weak (or short if the mechanism is strong).

FIG. 18(a) illustrates a modulator 120 based on the Mach-Zehnder 118 disclosed in FIG. 17. As illustrated also in FIG. 18(b), parallel plate electrodes 122 and 124 are disposed above and below, respectively, each of the strips 100 which interconnects two angled sections 104, and spaced from it, by the dielectric material, at a distance large enough that optical coupling to the electrodes is negligible. The electrodes are connected in common to one terminal of a voltage source 126, and the intervening strip 100 is connected using a minimally invasive contact to the other terminal. Variation of the voltage V applied by source 126 effects the modulating action. According to the plasma model for the strip 100, a change in the carrier density of the latter (due to charging +2Q or −2Q) causes a change in its permittivity, which in turn causes a change in the insertion phase of the arm. (The change induced in the permittivity is described by the plasma model representing the guiding strip 100 at the operating wavelength of interest. Such model is well known to those of ordinary skill in the art and so will not be described further herein. For more information the reader is directed to reference [21], for example.) This change is sufficient to induce destructive interference when the waves in both arms re-combine at the output combiner.

FIG. 18(c) illustrates an alternative connection arrangement in which the two plate electrodes 122 and 124 are connected to respective ones of the terminals of the voltage source 126. In this case, the dielectric material used as the background of the waveguide is electro-optic (LiNbO$_3$, an electro-optic polymer, . . . ). In this instance, the applied voltage V effects a change in the permittivity of the background dielectric, thus changing the insertion phase along the arm. This change is sufficient to induce destructive interference when the waves in both arms re-combine at the output combiner.

It will be noted that, in FIG. 18(a), one voltage source supplies the voltage $V_1$ while the other supplies the voltage $V_2$. $V_1$ and $V_2$ may or may not be equal.

For both cases described above, it is possible to apply voltages in opposite polarity to both arms of the structure. This effects an increase in the insertion phase of one arm and a decrease in the insertion phase of the other arm of the Mach-Zehnder (or vice versa), thus reducing the magnitude of the voltage or the length of the structure required to achieve a desirable degree of destructive interference at the output. For this connection, it is understood that the design described in FIG. 18(c) comprises a material that exhibits a linear electro-optic effect.

Also, it is possible to provide electrodes 122 and 124 and a source 126 for only one of the intervening strips 100 in order to provide the required interference.

It should be appreciated that other electrode structures could be used to apply the necessary voltages. For example, the electrodes 122 and 124 could be coplanar with the intervening strip 100, one on each side of it. By carefully laying out the electrodes as a microwave waveguide, a high frequency modulator (capable of modulation rates in excess of 10 Gbit/s) can be achieved.

Figure 19:
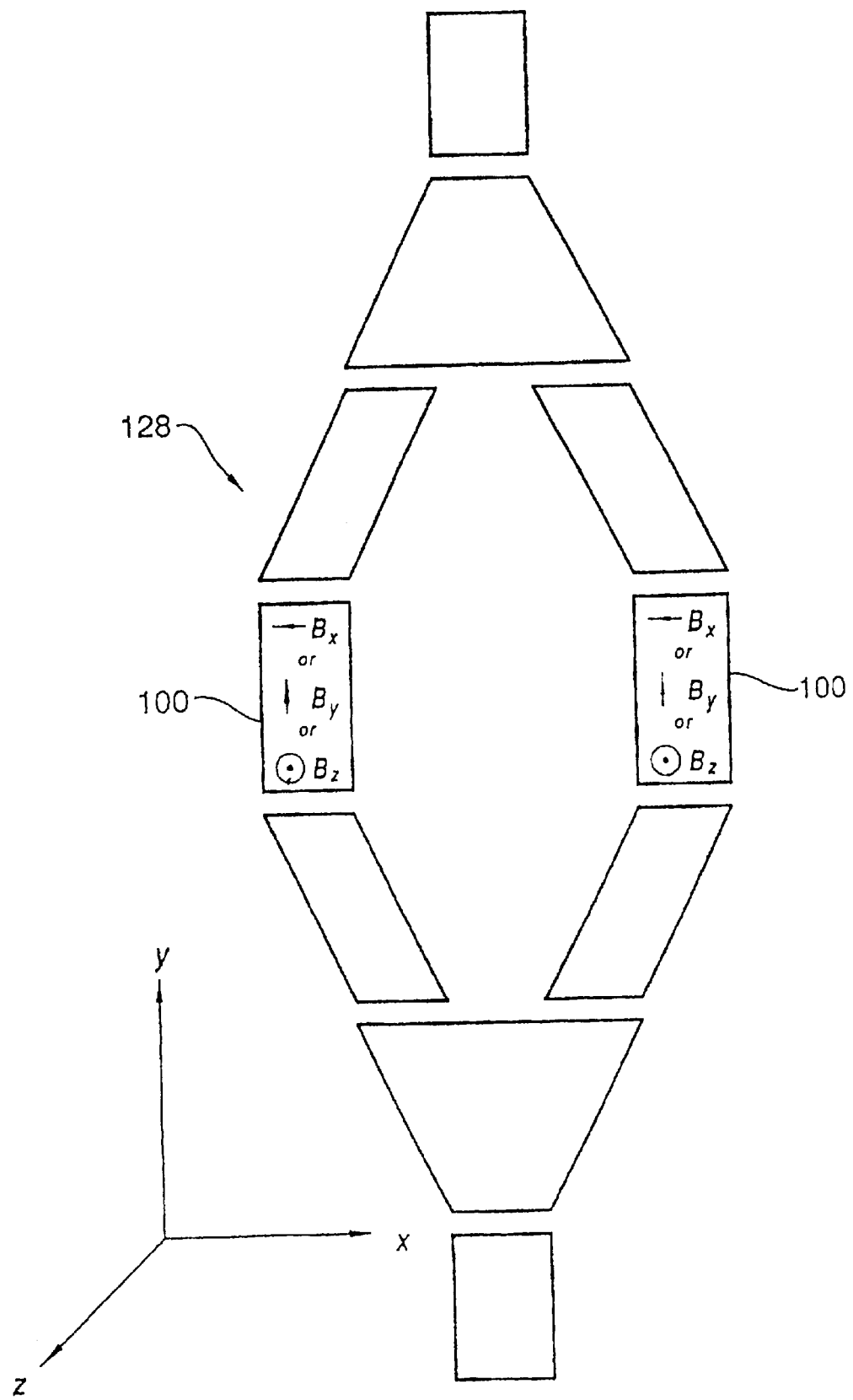
FIG. 19 is a plan view of a modulator using the Mach-Zehnder waveguide structure of FIG. 17 and illustrating magnetic field control.
Figure 20:
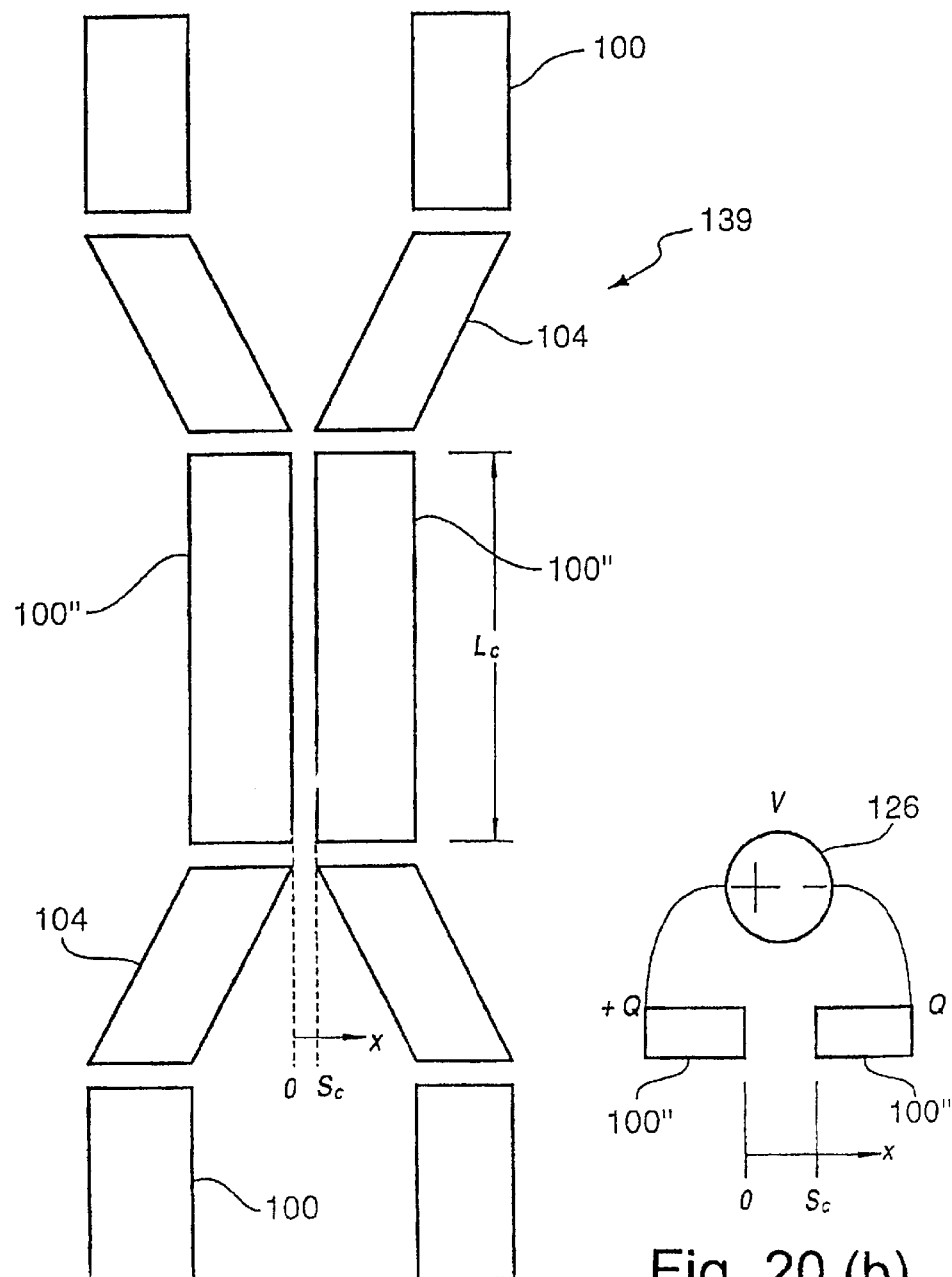
FIG. 20(a) is a plan view of an edge coupler formed by two parallel strips of straight waveguide with various other waveguides for coupling signals to and from them.
FIG. 20(b) is an inset diagram illustrating a way of applying a modulation control voltage.
Figure 21:
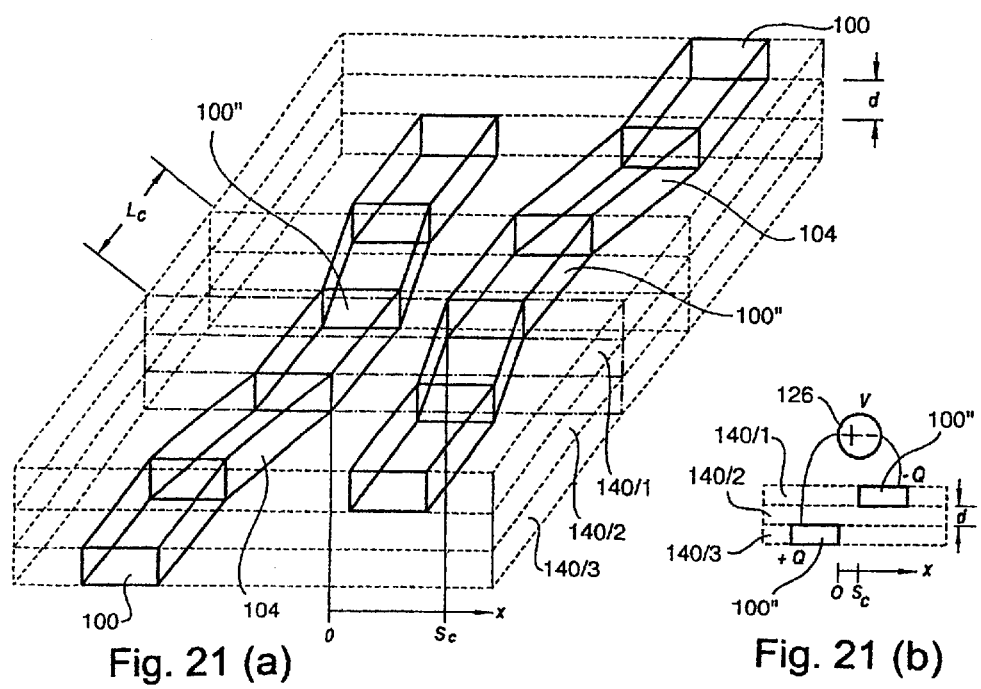
FIG. 21(a) is a perspective view of a coupler in which the parallel strips are not co-planar.
FIG. 21(b) is an inset diagram illustrating a way of applying a modulation control voltage.
Figure 22:
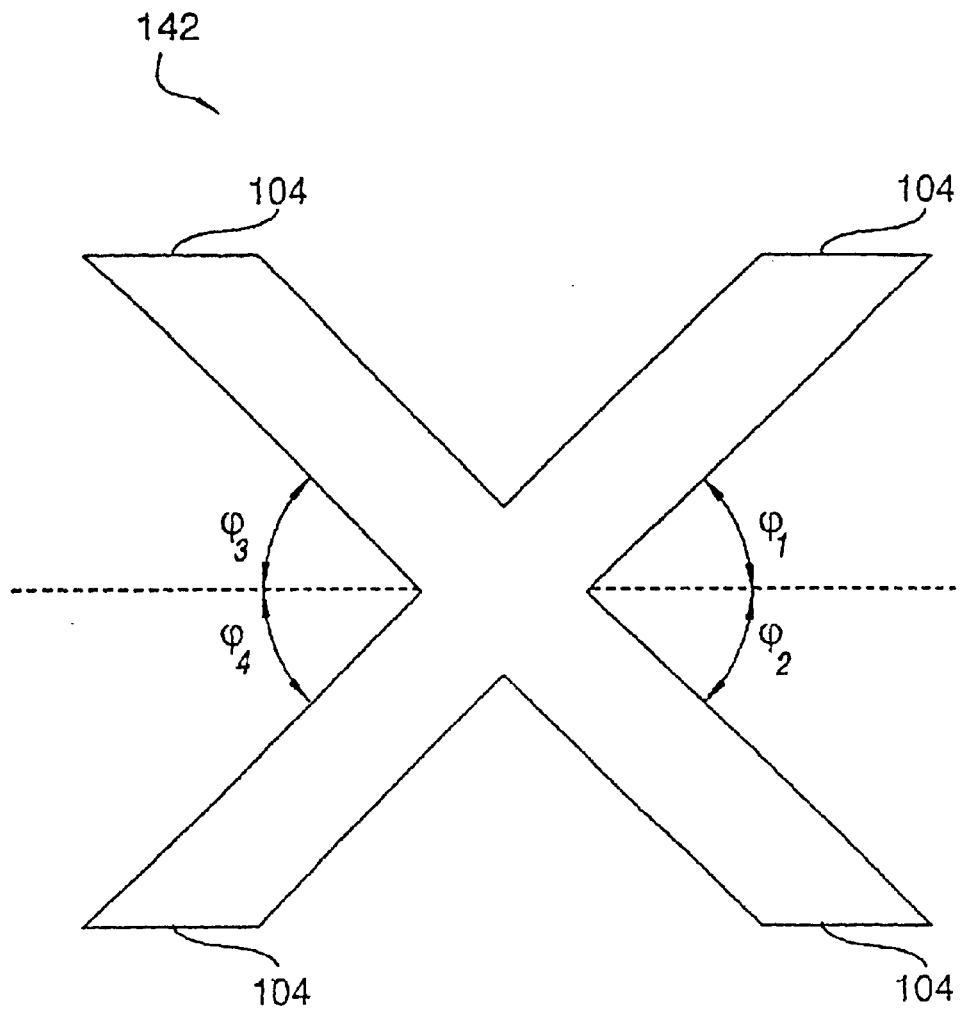
FIG. 22 is a plan view of an intersection formed by four sections of waveguide.
Figure 23:
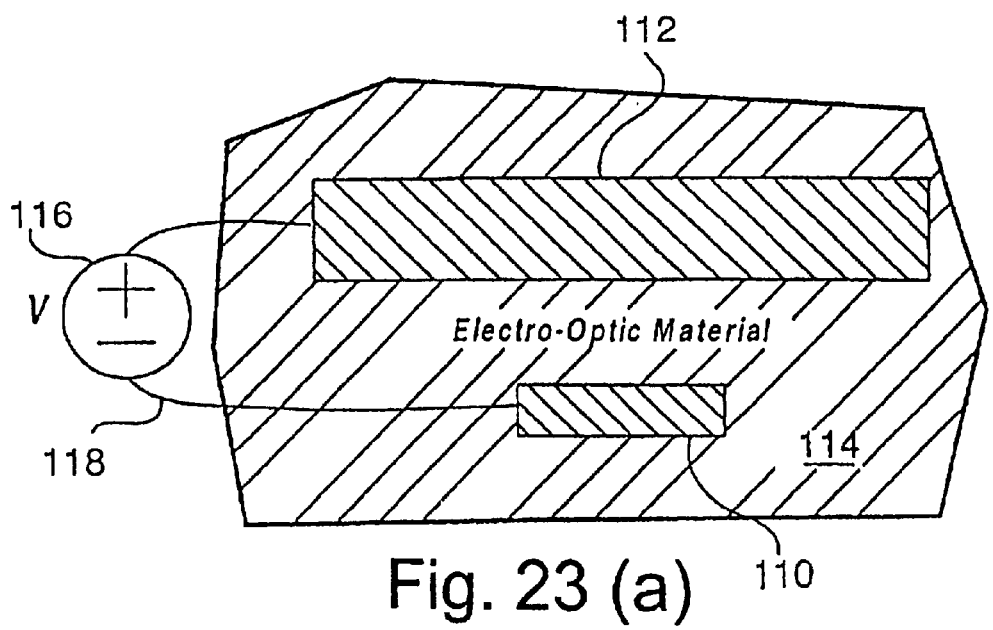
FIGS. 23(a), and 23(b) are a schematic front view and corresponding top plan view of an electro-optic modulator employing the waveguide structure of FIG. 8(a)
Figure 23:
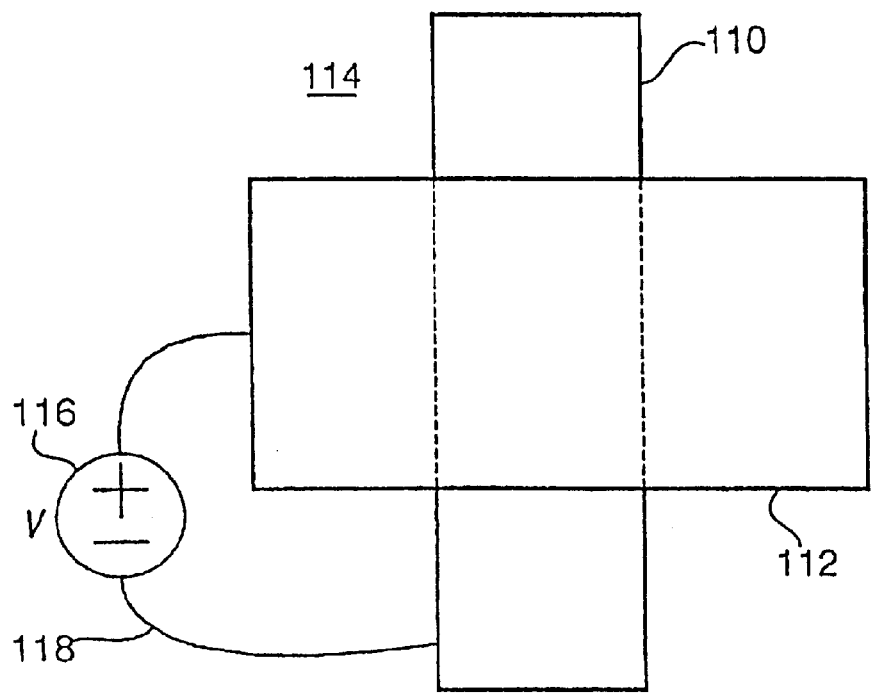
Figure 24:
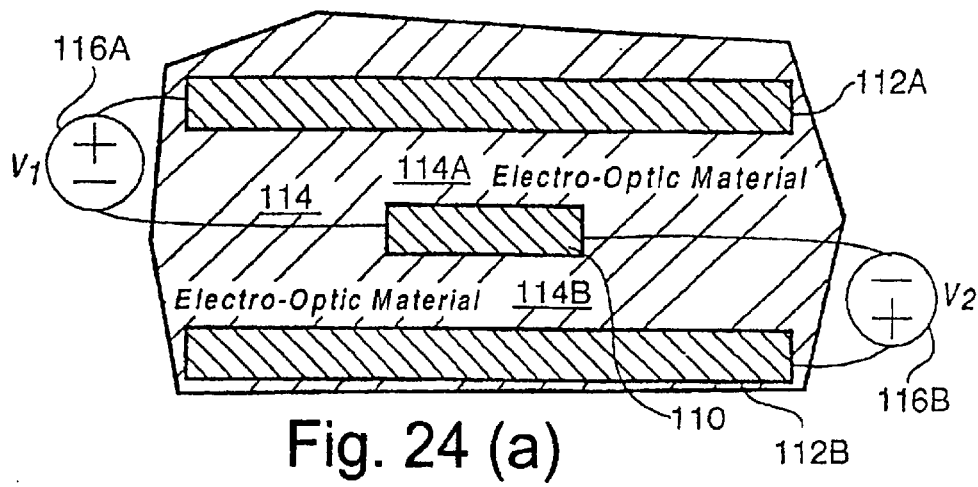
FIGS. 24(a), and 24(b) are a schematic front view and corresponding top view of an alternative electro-optic modulator also using the waveguide structure of FIG. 8(a)
FIG. 24(c) illustrates an alternative connection arrangement of the modulator of FIG. 24(a)
Figure 24:
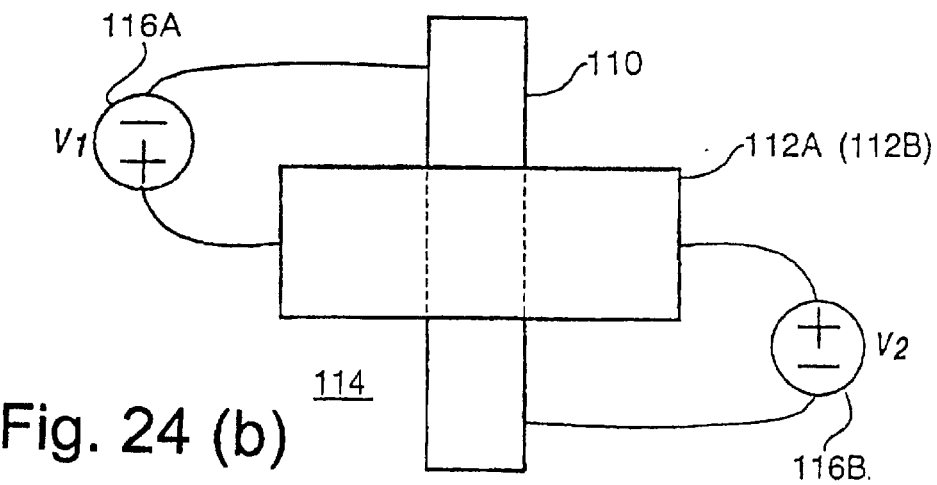
Figure 24:
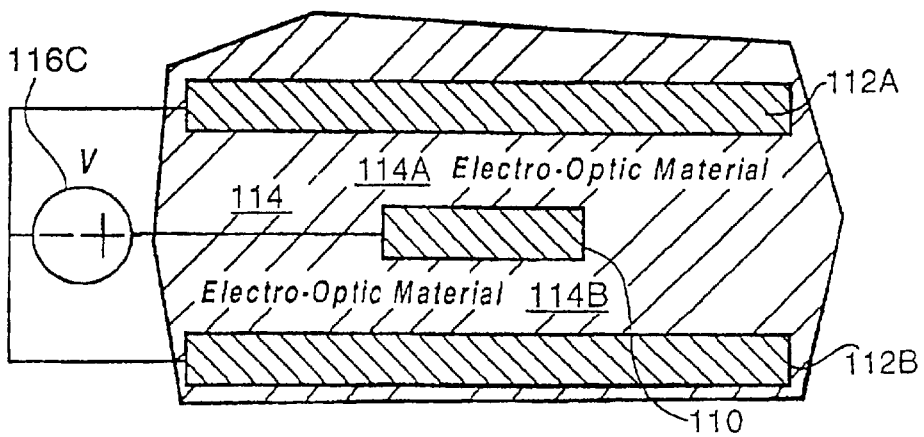

FIG. 19 illustrates an alternative implementation of a Mach-Zehnder 128 which has the same set of waveguides as that shown in FIG. 17 but which makes use of magnetic fields B applied to either or both of the middle straight section arms to induce a change in the permittivity tensor describing the strips. (The change induced in the tensor is described by the plasma model representing the guiding strip at the operating wavelength of interest. Such model is well known to those of ordinary skill in the art and so will not be described further herein. For more information the reader is directed to reference [21], for example.) The change induced in the permittivity tensor will induce a change in the insertion phase of either or both arms thus inducing a relative phase difference between the light passing in the arms and generating destructive interference when the waves re-combine at the output combiner. Modulating the magnetic field thus modulates the intensity of the light transmitted through the device. The magnetic field B can be made to originate from current-carrying wires or coils disposed around the arms 100 in such a manner as to create the magnetic field in the desired orientation and intensity in the optical waveguides. The magnetic field may have one or all of the orientations shown, $B_x$, $B_y$ or $B_z$ or their opposites. The wires or coils could be fabricated using plated via holes and printed lines or other conductors in known manner. Alternatively, the field could be provided by an external source, such as a solenoid or toroid having poles on one or both sides of the strip.

FIG. 20(a) illustrates a coupler 139 created by placing two substantially square cross-section waveguide strips 100" parallel to each other and in close proximity over a certain length. The separation $S_c$ between the strips 100" could be from 1 μm (or less) to 40 μm and the coupling length $L_c$ could be in the range of a few microns to a few dozen millimeters depending on the separation $S_c$, the dimensions of the strips 100", the materials used, the operating wavelength, and the level of coupling desired.

The gaps between the input and output of the waveguide sections shown would ideally be set to zero and a lateral offset provided between sections where a change of direction is involved. Curved sections could be used instead of the sections 104, 100 and 100" shown in FIG. 20(a).

Although only two strips 100" are shown in the coupled section, it should be understood that more than two strips can be coupled together to create an N×N coupler.

As illustrated in FIG. 20(b) a voltage can be applied to the two coupled sections 100" via minimally invasive electrical contacts. FIG. 20(b) shows a voltage source 126 connected directly to the sections 100" but, if the sections 100, 104 and 100" in each arm are connected together electrically, the source 126 could be connected to one of the other sections in the same arm. Applying a voltage in such a manner charges the arms of the coupler, which, according to the plasma model for the waveguide, changes its permittivity. If, in addition, the dielectric material placed between the two waveguides 100" is electro-optic, then a change in the background permittivity will also be effected as a result of the applied voltage. The first effect is sufficient to change the coupling characteristics of the structure but, if an electro-optic dielectric is also used, as suggested, then both effects will be present, allowing the coupling characteristics to be modified by applying a lower voltage.

FIGS. 21(a) and 21(b) illustrate coupled waveguides similar to those shown in FIG. 20(a) but placed on separate layers in a substrate having several layers 140/1, 140/2 and 140/3. The substantially square cross-section waveguide strips could be placed one directly above the other with a thin region of dielectric of thickness d placed between them. The coupled guides can also be offset from each other a distance $S_c$, as shown in FIGS. 21(a) and 21(b). The strips could be separated by d=1 μm (or less) to 20 μm, the coupling length could be in the range of a few microns to a few dozens millimeters and the separation $S_c$ could be in the range of −40 to +40 μm, depending on the width and thickness of the strips, the materials used and the level of coupling desired.

As before, curved sections could be used instead of the straight and angled sections shown in FIG. 21(a).

Gaps can be introduced longitudinally between the segments of strip if desired and a lateral offset between the straight and angled (or curved) sections could be introduced.

Though only two strips are shown in the coupled section, it should be understood that a plurality of strips can be coupled together on a layer and/or over many layers to create an N×N coupler. four slabs of different dielectric material. Moreover, the multilayer dielectric material(s) illustrated in FIG. 21(a) could be used for other devices too. Also, the metal strip could be replaced by some other conductive material or a highly n- or p-doped semiconductor. It is also envisaged that the conductive strip, whether metal or other material, could be multi-layered.

Specific Embodiments of Modulation and Switching Devices

Modulation and switching devices will now be described which make use of the fact that an asymmetry induced in optical waveguiding structures having as a guiding element a square cross-section met strip may inhibit propagation of the main long-ranging degenerate purely bound plasmon-polariton modes supported.

The asymmetry in the structure can be in the dielectrics surrounding the metal strip. In this case the permittivity, permeability or the dimensions of the dielectrics surrounding the strip can be different. A noteworthy case is where the dielectrics above and below the substantially square cross-section (w=t or w≈t) metal strip 100 have different permittivities, in a manner similar to that shown in FIG. 8(a).

A dielectric material exhibiting an electro-optic, magneto-optic, thermo-optic, or piezo-optic effect can be used as the surrounding dielectric medium. The modulation and switching devices make use of an external stimulus to induce or enhance the asymmetry in the dielectrics of the structure. As shown in FIGS. 8(c) and (d), a modest asymmetry of about $2 \times 10^{-4}$ induced in the dielectrics has a significant deleterious effect on the propagation of the plasmon-polariton wave, thus causing cut-off of the modes.

FIGS. 23(a) and 23(b) depict an electro-optic modulator comprising two metal strips 110 and 112 surrounded by a dielectric 114 exhibiting an electro-optic effect. Such a dielectric has a permittivity that varies with the strength of an applied electric field. The effect can be first order in the electric field, in which case it is termed the Pockels effect, or second order in the electric field (Kerr effect), or higher order. FIG. 23(a) shows the structure in cross-sectional view and FIG. 23(b) shows the structure in top view. The lower metal strip 110 and the surrounding dielectric 114 form the optical waveguide. The lower metal strip 110 is dimensioned such that a purely bound long-ranging plasmon-polariton wave is guided by the structure at the optical wavelength of interest. The strip 110 may have a substantially square cross-section, dimensioned such that the two main orthogonally polarised long-ranging plasmon-polariton modes are propagated. Since the guiding lower metal strip 110 comprises a metal, it is also used as an electrode and is connected to a voltage source 116 via a minimally invasive electrical contact 118 as shown. The second metal strip 112 is positioned above the lower metal strip 110 at a distance large enough that optical coupling between the strips is negligible. It is noted that the second strip can also be placed below the waveguiding strip instead of above. The second strip acts as a second electrode.

The intensity of the optical signal output from the waveguide can be varied or modulated by varying the intensity of the voltage V applied by the source 116. When no voltage is applied, the waveguiding structure is symmetrical and supports plasmon-polariton waves. When a voltage is applied, an asymmetry in the waveguiding structure is induced via the electro-optic effect present in the dielectric 114, and the propagation of the plasmon-polariton waves is inhibited. The degree of asymmetry induced may be large enough to completely cut-off the main purely bound long-ranging modes, thus enabling a very high modulation depth to be achieved, i.e. substantial extinction. By carefully laying out the electrodes, a high frequency modulator (capable of modulation rates in excess of 10 Gbit/s) can be achieved.

FIGS. 24(a) and 24(b) show an alternative design for an electro-optic modulator which is similar to that shown in FIG. 23(a) but comprises electrodes 112A and 112B placed above and below, respectively, of the substantially square cross-section metal optical waveguide strip 110 at such a distance that optical coupling between the strips is negligible. FIG. 24(a) shows the structure in cross-sectional view and FIG. 24(b) shows the structure in top view. A first voltage source 116A connected to the metal strip 110 and the upper electrode 112A applies a first voltage $V_1$ between them. A second voltage source 116B connected to metal strip 110 and lower electrode 112B applies a voltage $V_2$ between them. The voltages $V_1$ and $V_2$, which are variable, produce electric fields $E_1$ and $E_3$ in portions 114A and 114B of the dielectric material. The dielectric material used exhibits a linear electro-optic effect. The waveguide structure shown in FIG. 24(c) is similar in construction to that shown in FIG. 24(a) but only one voltage source 116C is used. The positive terminal (+) of the voltage source 116C is shown connected to metal strip 110 while its negative terminal (−) is shown connected to both the upper electrode 112A and the lower electrode 112B. With this configuration, the electric fields $E_1$ and $E_2$ produced in the dielectric portions 114A and 114B, respectively, are in opposite directions. Thus, whereas, in the waveguide structure of FIG. 24(a), selecting appropriate values for the voltages $V_1$ and $V_2$ induces the desired asymmetry in the waveguide structure of FIG. 24(c), the asymmetry is induced by the relative direction of the electric field above and below the waveguiding strip 110, since the voltage V applied to the electrodes 112A and 112B produces electric fields acting in opposite directions in the portions 114A and 114B of the dielectric material.

By carefully designing the electrodes, the structures shown in FIGS. 24(a),(b) and (c) can operate to very high frequencies.

Figure 25:
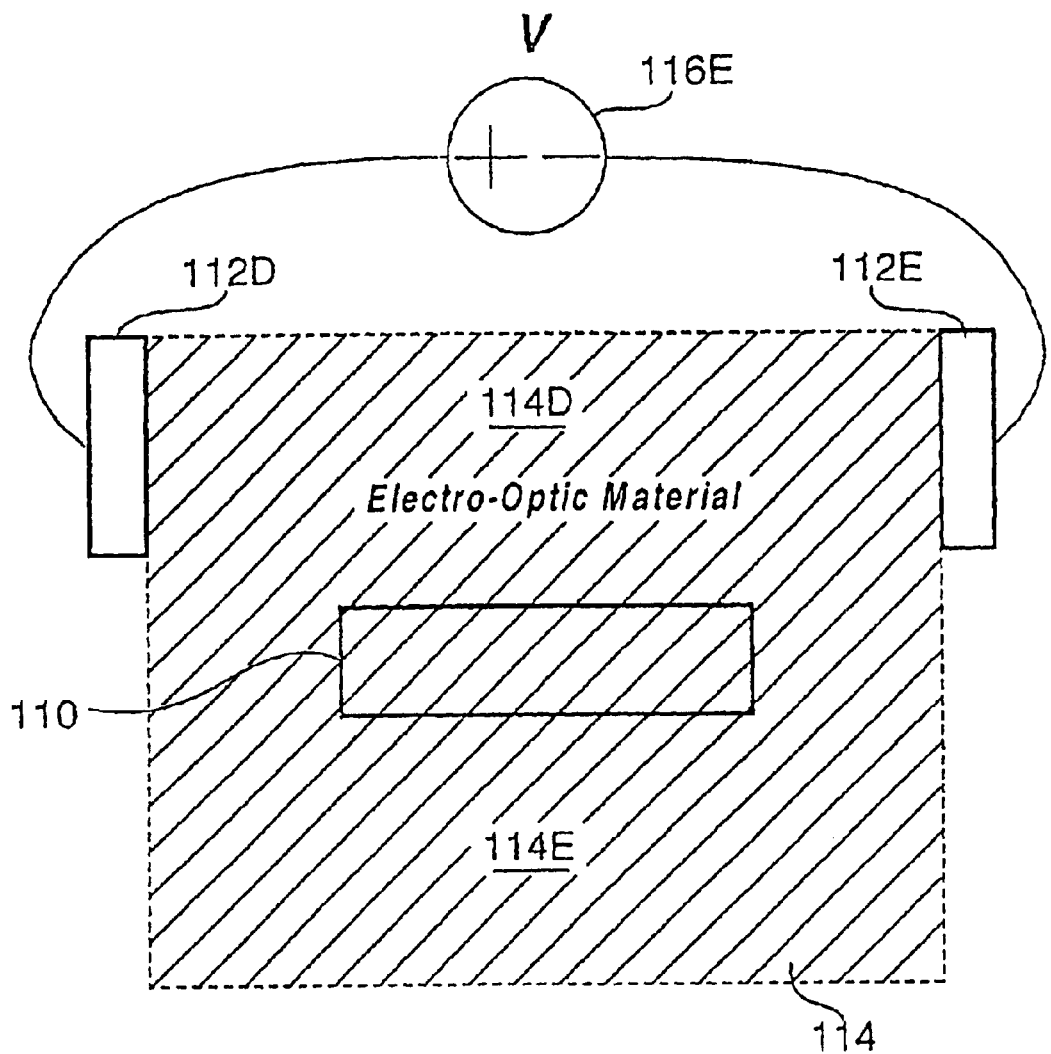
FIG. 25 is a schematic front view of a third embodiment of electro-optic modulator also using: the waveguide structure of FIG. 8(a)

FIG. 25 shows in cross-sectional view yet another design for an electro-optic modulator. In this case, the substantially square cross-section metal waveguide strip 110 is embedded in the middle of dielectric material 114 with first portion 114D above it and second portion 114E below it. Electrodes 112D and 112E are placed opposite lateral along opposite lateral edges, respectively, of the upper portion 114D of the dielectric 114 as shown and connected to voltage source 116E which applies a voltage between them to induce the desired asymmetry in the structure. Alternatively, the electrodes 112D, 112E could be placed laterally along the bottom portion 114E of the dielectric 114, the distinct portions of the dielectric material still providing the asymmetry being above and below the strip.

Figure 26:
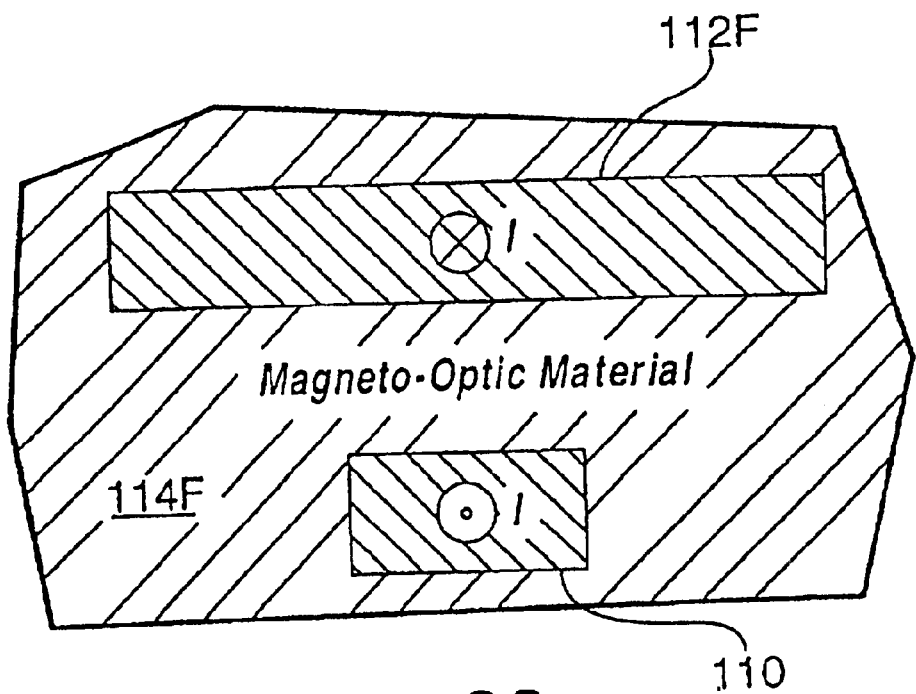
FIG. 26 is a schematic front view of a magneto-optic modulator also using the waveguide structure of FIG. 8(a)

FIG. 26 shows an example of a magneto-optic modulator wherein the substantially square cross-section metal waveguide strip 110 and overlying electrode 112F are used to carry a current I in the opposite directions shown. The dielectric material surrounding the metal waveguide strip 110 exhibits a magneto-optic effect or is a ferrite. The magnetic fields generated by the current I add in the dielectric portion between the electrodes 110 and 112F and essentially cancel in the portions above the top electrode 112F and below the waveguide 110. The applied magnetic field thus induces the desired asymmetry in the waveguiding structure. The electrode 112F is placed far enough from the guiding strip 110 that optical coupling between the strips is negligible.

Figure 27:
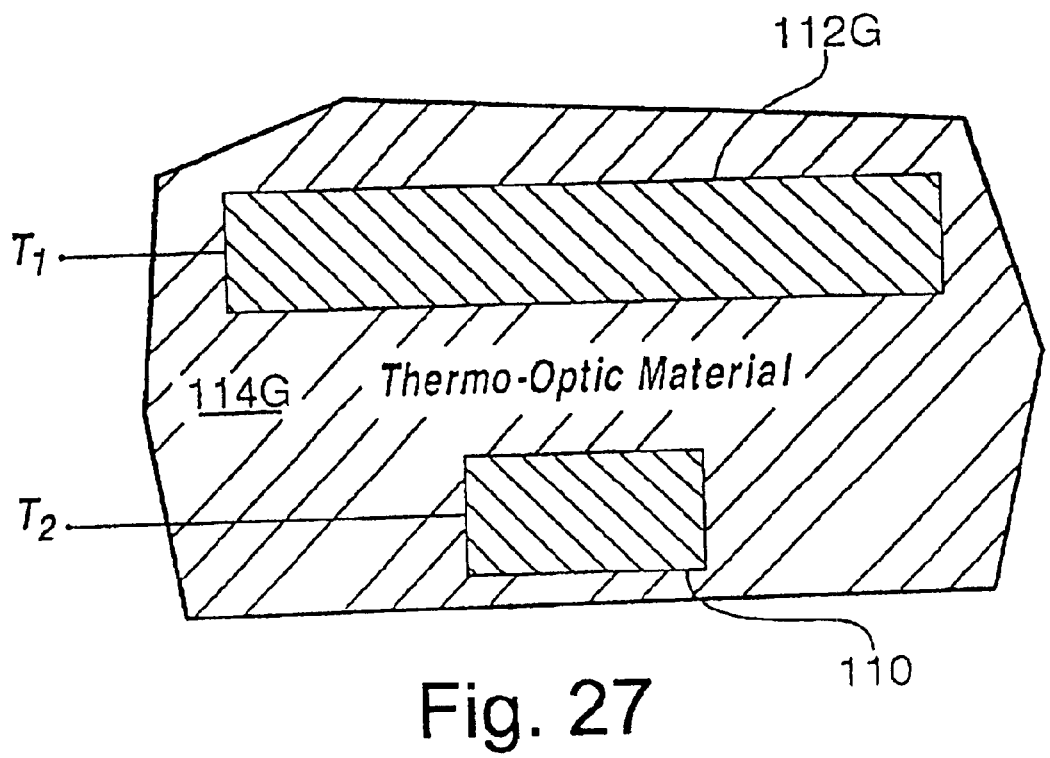
FIG. 27 is a schematic front view of a thermo-optic modulator also using the waveguide structure of FIG. 8(a)

FIG. 27 depicts a thermo-optic modulator wherein the substantially square cross-section metal waveguide strip 110 and the overlying electrode 112G are maintained at temperatures $T_2$ and $T_1$ respectively. The dielectric material 114 surrounding the metal waveguide exhibits a thermo-optic effect. The temperature difference creates a thermal gradient in the dielectric portion 114G between the electrode 112G and the strip 110. The variation in the applied temperature thus induces the desired asymmetry in the waveguiding structure. The electrode 112G is placed far enough from the guiding strip 110 that optical coupling between the strips is negligible.

It should be appreciated that the modulator devices described above with reference to FIGS. 23(a) to 27 may also serve as variable optical attenuators with the attenuation being controlled via the external stimulus, i.e. voltage, current, temperature, which varies the electromagnetic property.

Figure 28:
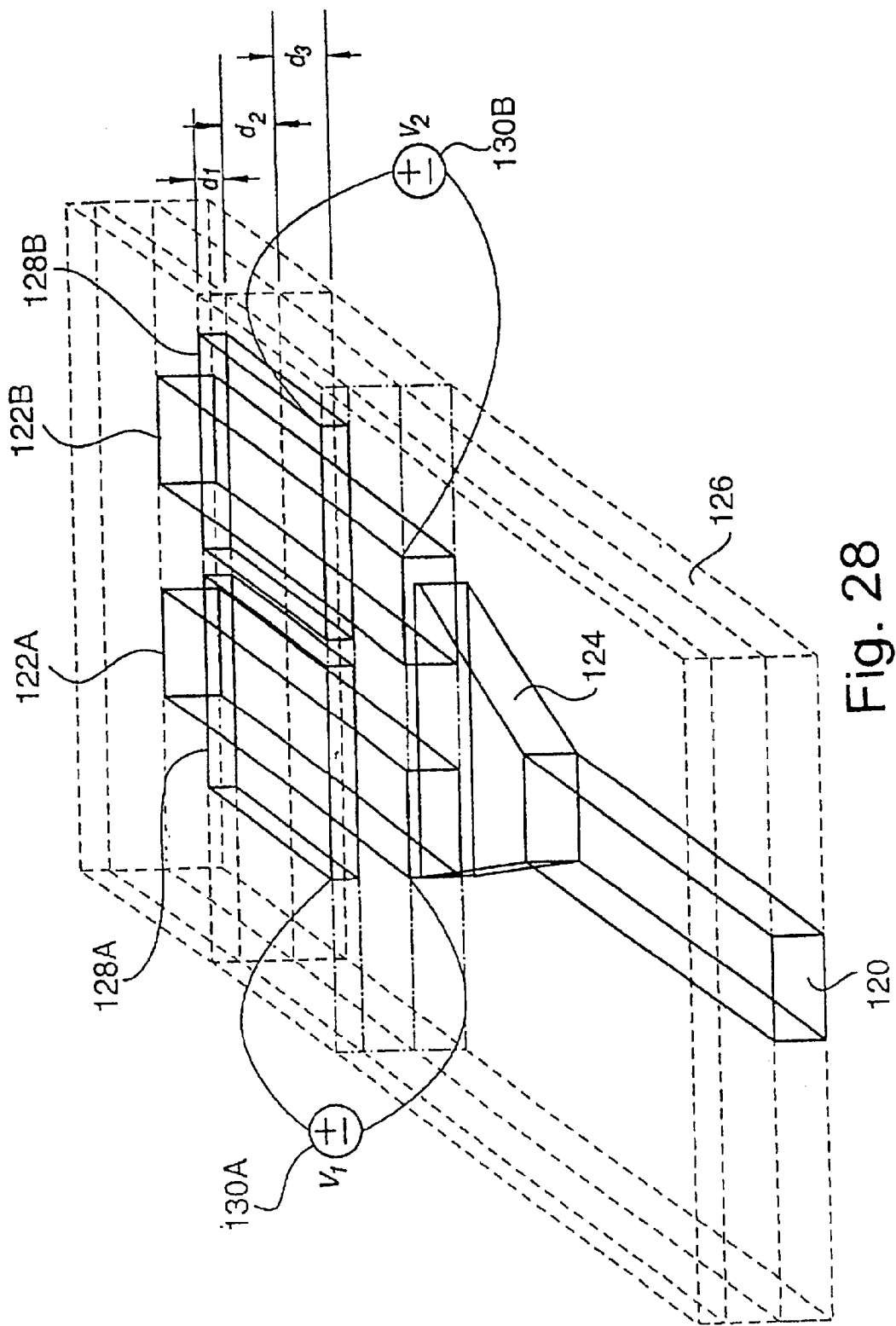
FIG. 28 is a schematic perspective view of an electro-optic switch also using the waveguide structure of FIG. 8(a)
Figure 29:
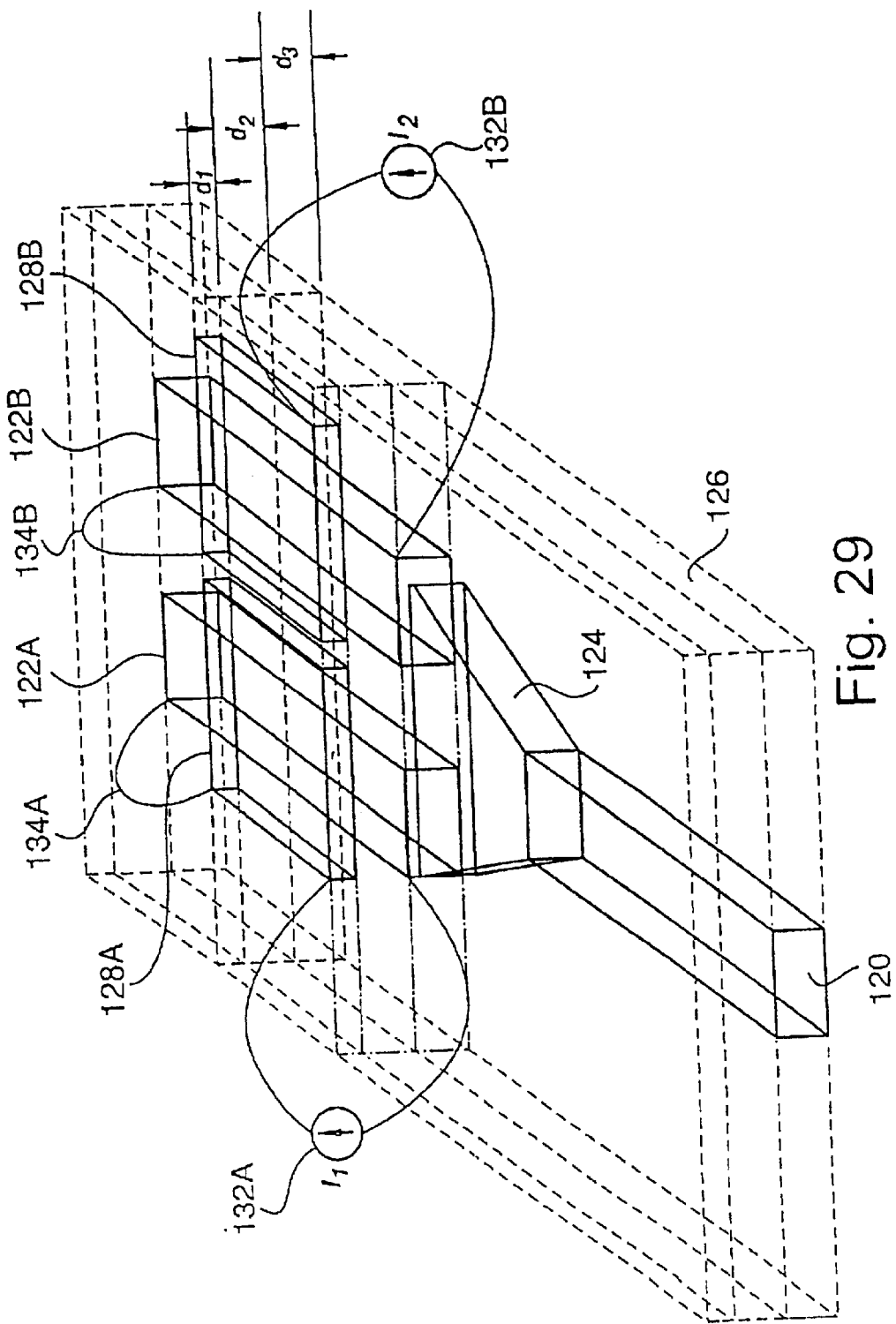
FIG. 29 is a schematic perspective view of a magneto-optic switch also using the waveguide structure of FIG. 8(a)
Figure 30:
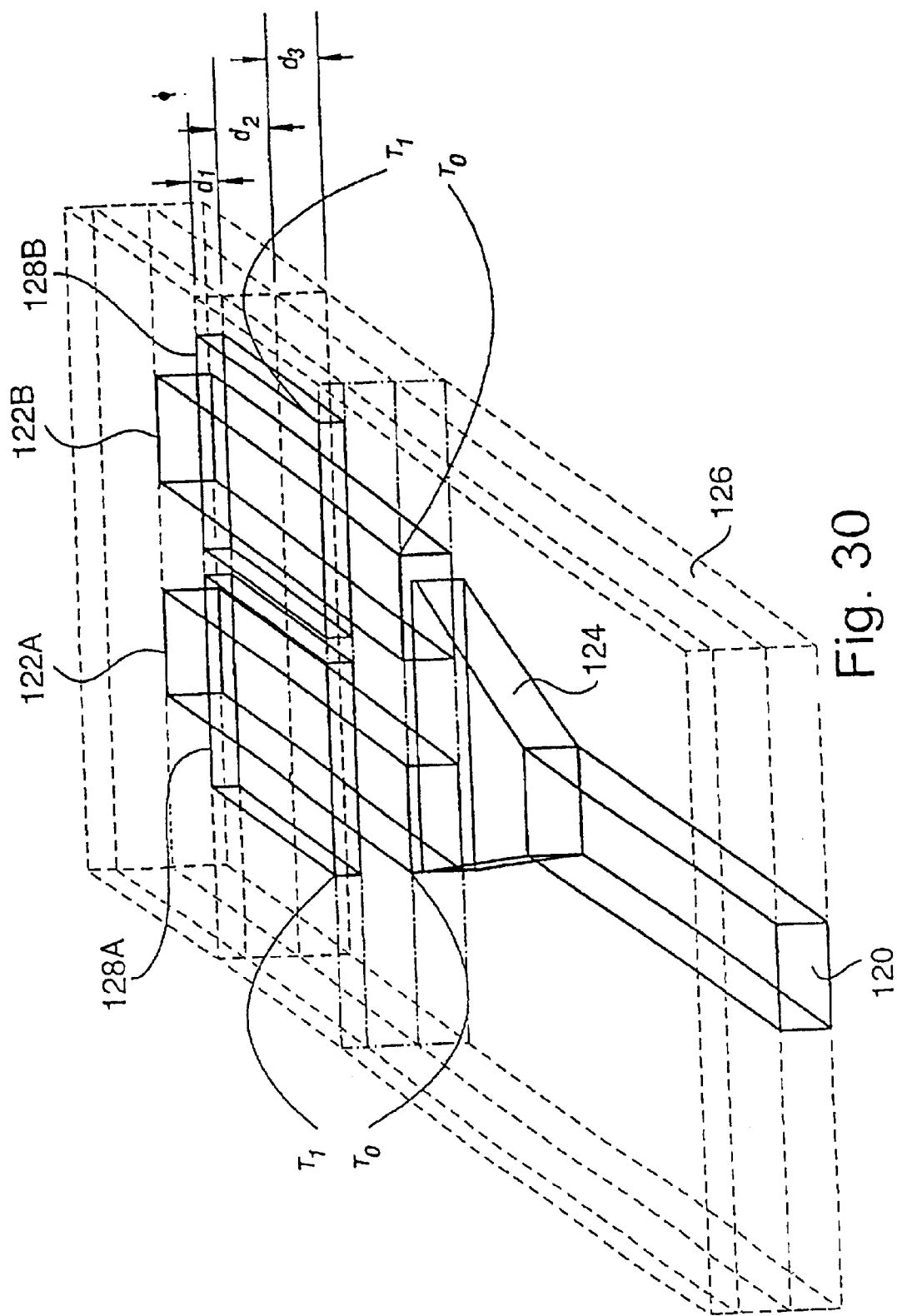
FIG. 30 is a schematic perspective view of a thermo-optic switch also using the waveguide structure of FIG. 8(a)

FIGS. 28, 39 and 30 depict optical switches that operate on the principle of "split and attenuate". In each case, the input optical signal is first split into N outputs using a power divider; a one-to-two power split being shown in FIGS. 28, 29 and 30. The undesired outputs are then "switched off" or highly attenuated by inducing a large asymmetry in the corresponding output waveguides. The asymmetry must be large enough to completely cut-off the main purely bound long-ranging mode supported by the waveguides. The asymmetry is induced by means of overlying electrodes as in the waveguide structures of FIGS. 23, 26 or 27, respectively.

In the switches shown in FIGS. 28, 29 and 30, the basic waveguide configuration is the same and comprises a substantially square cross-section metal input waveguide section 120 coupled to two parallel substantially square cross-section metal branch sections 122A and 122B by a wedge-shaped splitter 124. All four sections 120, 122A, 122B and 124 are co-planar and embedded in dielectric material 126. The thickness of the metal strips is $d_3$. Two rectangular electrodes 128A and 128B, each of thickness $d_1$, are disposed above branch sections 122A and 122B, respectively, and spaced from them by a thickness $d_2$ of the dielectric material 126 at a distance large enough that optical coupling between the strips is negligible. Each of the electrodes 128A and 128B is wider and shorter than the underlying metal strip 122A or 122B, respectively. In the switch shown in FIG. 28, the asymmetry is induced electro-optically by means of a first voltage source 130A connected between metal strip 122A and electrode 128A for applying voltage $V_1$ therebetween, and a second voltage source 130B connected between metal strip 122B and electrode 128B, for applying a second voltage $V_2$ therebetween. In the switch shown in FIG. 29, the asymmetry is induced magneto-optically by a first current source 132A connected between metal strip 122A and electrode 128A, which are connected together by connector 134A to complete the circuit, and a second current source 132B connected between metal strip 122B and electrode 128B, which are connected together by connector 134B to complete that circuit.

In the switch shown in FIG. 30, the asymmetry is induced thermo-optically by maintaining the metal strips 122A and 122B at temperature $T_0$ and the overlying electrodes 128A and 128B at temperatures $T_1$ and $T_2$, respectively.

It will be appreciated that, in the structures shown in FIGS. 28, 29 and 30, the dielectric surrounding the metal strip will be electro-optic, magneto-optic, or thermo-optic, or a magnetic material such as a ferrite, as appropriate.

In general, any of the sources, whether of voltage, current or temperature, may be variable.

Moreover, either of the splitter configurations shown in FIGS. 14 and 16 could be substituted for that shown in FIGS. 28, 29 and 30.

Although the switches shown in FIGS. 28, 29 and 30 are 1×2 switches, the invention embraces 1×N switches which can be created by adding more branch sections and associated electrodes, etc.

It will be appreciated that, where the surrounding material is acousto-optic, the external stimulus used to induce or enhance the asymmetry could be determined by analogy. For example, a structure similar to that shown in FIG. 25 could be used with the electro-optic material replaced by acousto-optic material and the electrodes 112D and 112E used to apply compression or tension to the upper portion 114D.

To facilitate description, the various devices embodying the invention have been shown and described as comprising several separate sections of the novel waveguide structure. While it would be feasible to construct devices in this way, in practice, the devices are likely to comprise continuous strips of metal or other high charge carrier density material, i.e. integral strip sections, fabricated on the same substrate.

The foregoing examples are not meant to be an exhaustive listing of all that is possible but rather to demonstrate the breadth of application of the invention. The inventive concept can be applied to various other elements suitable for integrated optics devices. It is also envisaged that waveguide structures embodying the invention could be applied to multiplexers and demultiplexers.

Industrial Applicability

Embodiments of the invention may be useful for signal transmission and routing or to construct components such as couplers, power splitters/combiners, interferometers, modulators, switches, periodic structures and other typical components of integrated optics.

Although embodiments of the invention have been described and illustrated in detail, it is to be clearly understood that the same is by way of illustration and example only and not to be taken by way of the limitation, the spirit and scope of the present invention being limited only by the appended claims.

REFERENCES

1. *American Institute of Physics Handbook,* third edition. McGraw-Hill Book Company, 1972.
2. *Handbook of Optics.* McGraw-Hill Book Company, 1978.
3. NASH, D. J., SAMBLES, J. R. "Surface Plasmon-Polariton Study of the Optical Dielectric Function of Silver", *Journal of Modern Optics,* Vol. 43, No. 1 (1996), pp. 81–91.
4. BOARDMAN, A. D., Editor. *Electromagnetic Surface Modes.* Wiley Interscience, 1982.
5. ECONOMOU, E. N. "Surface Plasmons in Thin Films", *Physical Review,* Vol. 182, No. 2 (June 1969), pp. 539–554.
6. BURKE, J. J. STEGEMAN, G. I., TAMIR, T. "Surface-Polariton-Like Waves Guided by Thin, Lossy Metal Films", *Physical Review B,* Vol. 33, No. 8 (April 1986), pp. 5186–5201.
7. WENDLER, L., HAUPT, R. "Long-Range Surface Plasmon-Polaritons in Asymmetric Layer Structures", *Journal of Applied Physics,* Vol. 59, No. 9 (May 1986), pp. 3289–3291.
8. BURTON, F. A., CASSIDY, S. A. "A Complete Description of the Dispersion Relation for Thin Metal Film Plasmon-Polaritons", *Journal of Lightwave Technology,* Vol. 8, No. 12 (December 1990), pp. 1843–1849.
9. PRADE, B., VINET, J. Y., MYSYROWICZ, A. "Guided Optical Waves in Planar Heterostructures With Negative Dielectric Constant", *Physical Review B,* Vol. 44, No. 24 (December 1991), pp. 13556–13572.
10. TOURNOIS, P., LAUDE, V. "Negative Group Velocities in Metal-Film Optical Waveguides", *Optics Communications,* April 1997, pp. 41–45.
11. JOHNSTONE, W., STEWART, G., HART, T., CULSHAW B. "Surface Plasmon Polaritons in Thin Metal Films and Their Role in Fiber Optic Polarizing Devices", *Journal of Lightwave Technology,* Vol. 8, No. 4 (April 1990), pp. 538–544.
12. RAJARAJAN, M., THEMISTOS, C., RAHMAN, B. M. A., GRATTAN, K. T. V. "Characterization of Metal-Clad TE/TM Mode Splitters Using the Finite Element Method", *Journal of Lightwave Technology,* Vol. 15, No. 12 (December 1997), pp. 2264–2269.
13. BERINI, P. "Plasmon-Polariton Modes Guided by a Metal Film of Finite Width", *Optics Letters,* Vol. 24, No. 15 (August 1999), pp. 1011–1013.
14. PREGLA, R., PASCHER, W. "The Method of Lines", *Numerical Techniques for Microwave and Millimeter-Wave Passive Structures.* Wiley Interscience, 1989. T. ITOH, Editor.
15. BERINI, P., WU, K. "Modeling Lossy Anisotropic Dielectric Waveguides With the Method of Lines", *IEEE Transactions on Microwave Theory and Techniques,* Vol. MTT-44, No. 5 (May 1996), pp. 749–759.
16. BERINI, P., STÖHR, A., WU, K., JÄGER, D. "Normal Mode Analysis and Characterization of an InGaAs/GaAs MQW Field-Induced Optical Waveguide Including Electrode Effects", *Journal of Lightwave Technology,* Vol. 14, No. 10 (October 1996), pp. 2422–2435.
17. CULVER, R. "The Use of Extrapolation Techniques With Electrical Network Analogue Solutions", *British Journal of Applied Physics,* Vol. 3 (December 1952), pp. 376–378.
18. BOONTON, R. C. *Computational Methods for Electromagnetics and Microwaves.* Wiley Interscience, 1992,
19. STEGEMAN, G. I., WALLIS, R. F., MARADUDIN, A. A. "Excitation of Surface Polaritons by End-Fire Coupling", *Optics Letters,* Vol. 8, No. 7 (July 1983), pp. 386–388.
20. BERINI, P. "Plasmon-Polariton Waves Guided by Thin Lossy Metal Films of Finite Width: Bound Modes of Symmetric Structures", *Physical Review B,* Vol. 61, No. 15, (2000), pp. 10484–10503.
21. KRAUS, et al., *Electromagnetics,* second edition. McGraw Hill.
22. CHARBONNEAU, R., BERINI, P., BEROLO, E., LISICKA-SKRZEK, E., "Experimental Observation of Plasmon-Polariton Waves Supported by a Thin Metal Film of Finite Width", *Optics Letters,* Vol. 25, No. 11, pp. 844–846, June 2000.
23. EVANS, A. F., HALL, D. G., "Measurement of the electrically induced refractive index change in silicon for wavelength $\lambda=1.3$ $\mu$m using a Schottky diode" *Applied Physics Letters,* Vol. 56, No. 3, pp. 212–214, January 1990.
24. JUNG, C., YEE, S., KUHN, K., "Integrated Optics Waveguide Modulator Based on Surface Plasmors", *Journal of Lightwave Technology,* Vol. 12, No. 10, pp. 1802–1806, October 1994.
25. SOLGAARD, O., HO, F., THACKARA, J. 1., BLOOM, D. M., "High frequency attenuated total internal reflection light modulator", *Applied Physics Letters,* Vol. 61, No. 21, pp. 2500–2502, November 1992.
26. SOLGAARD, O., et al., "Electro-optic Attenuated Total Internal Reflection Modulator and Method", U.S. Pat. No. 5,155,617, 1992.
27. SCHILDKRAUT, J. S., "Long-range surface plasmon electro-optic modulator", *Applied Optics,* Vol. 27, No. 21, pp. 4587–4590, November 1988
28. SCHILDKRAUT, J. S., et al., "Optical Article for Reflection Modulation", U.S. Pat. No. 5,157,541, 1992.
29. SCHILDKRAUT, J. S., et al., "Optical Article for Multicolor Imaging", U.S. Pat. No. 5,075,796, 1991.
30. SCHILDKRAUT, J. S., et al., "Optical Article for Reflection Modulation", U.S. Pat. No. 4,971,426, 1990.
31. RIDER, C. B., et al., "Nonlinear Optical Article for Modulating Polarized Light", U.S. Pat. No. 4,948,225, 1990.
32. COLLINS, R. T., et al., "Optical Modulator", U.S. Pat. No. 4,915,482, 1990.
33. McNEILL, W. H., et al., "High Frequency Light Modulation Device", U.S. Pat. No. 4,451,123, 1984.
34. McNEILL, W. H., et al., "High Frequency Light Modulator", U.S. Pat. No. 4,432,614, 1984.
35. SINCERBOX, G. T., et al., "Projection Display Device", U.S. Pat. No. 4,249,796, 1981.
36. BROWN, T. G., "Optoelectronic Device for Coupling Between an External Optical Wave and a Local Optical Wave for Optical Modulators and Detectors", U.S. Pat. No. 5,625,729, 1997.
37. JANSSON, T. P., et al., "High Modulation Rate Optical Plasmon Waveguide Modulator", U.S. Pat. No. 5,067,788, 1991.
38. DRIESSEN, A., KLEIN KOERKAMP, H. M. M., POPMA, TH. J. A., "Novel Integrated Optic Intensity Modulator Based on Mode Coupling", *Fibre and Integrated Optics,* Vol. 13, pp. 445–461, 1994.
39, HOEKSTRA, H. J. W. M., LAMBECK, P. V., KRIJNEN, G. J. M., CTYROKY, J., De MINICIS, M., SIBILIA, C., CONRADI, O., HELFERT, S., PREGLA, R., "A COST 240 Benchmark Test for Beam Propagation Methods Applied to an Electrooptical Modulator Based on Surface Plasmons", *Journal of Lightwave Technology,* Vol. 16, No. 10, pp. 1921–1926, October 1998.
40. ANEMOGIANNIS, E., "Optical Plasmon Wave Structures", U.S. Pat. No. 6,034,809, 2000.

41. BERINI, P., "The Proximity Effect of Conductors in Optical Waveguide Devices: Coupling to Plasmon-Polariton Modes", *SPIE SD-25 Millimeter-Wave Materials Devices and Components*, in print, July 2000.
42. CHEN, Y. -J., et al., "Optical Device With Surface Plasmons", U.S. Pat. No. 4,583,818, 1986.
43. BERINI, P., "Optical Waveguide Structures", Copending Canadian and U.S. patent applications.
44. BERINI, P., "Plasmon-Polariton Modes Guided by a Metal Film of Finite Width Bounded by Different Dielectrics", *Optics Express*, Vol. 7, No. 10, pp. 329–335.
45. BERINI, P., "Plasmon-Polariton waves guided by thin lossy metal films of finite width: Bound Modes of Asymmetric Structures", *Physical Review B*, vol. 63, 125417, March 2001.

What is claimed is:

1. An optical device comprising a waveguide structure formed by a strip of material having a relatively high free charge carrier density surrounded by material having a relatively low free charge carrier density, the strip having finite width (W) and thickness (t) of the same order with dimensions such that optical radiation having a wavelength in a predetermined range couples to the strip and propagates along the length of the strip as a plasmon-polariton wave.

2. An optical device according to claim 1, wherein the material comprises two distinct portions with the strip extending therebetween, at least one of the two distinct portions having at least one variable electromagnetic property, and that the device further comprises means for varying the value of said electromagnetic property of said one of the portions so as to vary the propagation characteristics of the plasmon-polariton wave.

3. A device according to claim 2, wherein, for one said value of the electromagnetic property for said one of the portions propagation of the plasmon-polariton wave is supported and for another value of said electromagnetic property of said one of said portions propagation of the plasmon-polariton wave is at least inhibited.

4. A device according to claim 2, wherein said means for varying the electromagnetic property changes the size of at least one of said portions.

5. A device according to claim 2, wherein one of said portions is a fluid.

6. A device according to claim 2, wherein said electromagnetic property is permittivity and the varying means varies the permittivity by inducing a change in one or more of an electrical field in material of said portion, magnetic field in material of said portion, mechanical strain in material of said portion, and temperature in the material of said portion.

7. A device according to claim 2, wherein said electromagnetic property is a permeability and the varying means varies the permittivity by inducing a change in one or more of a magnetic field in material of said portion, mechanical strain in the material of said portion, and temperature in the material of said portion.

8. A device according to claim 7, wherein the varying means comprises a coil formed by metal-plated via holes and surface conductors.

9. A device according to claim 8, wherein the varying means comprises a solenoid having magnetic poles either side of the strip.

10. A device according to claim 2, wherein the material is electro-optic and the varying means comprises an electrode overlying or underlying said one of said portions and means for applying a potential difference between the electrode and the strip.

11. A device according to claim 2, wherein the material of at least said first portion is electro-optic and the varying means comprises first and second electrodes overlying and underlying, respectively, the strip, said at least one of the two distinct portions being between the first electrode and the strip and the other of said portions being between the second electrode and the strip, and means for applying a potential difference between the strip and said first electrode.

12. A device according to claim 11, wherein the second of said two distinct portions also comprises an electro-optic material and the applying means comprises a first voltage source for applying a first potential difference between the strip and the first electrode and a second voltage source for applying a second potential difference between the strip and the second electrode.

13. A device according to claim 11, wherein the applying means comprises means for coupling one terminal of a voltage source to the strip and a second terminal of the voltage source in common to the first and second electrodes.

14. A device according to claim 2, wherein the first portion comprises electro-optic material and the varying means comprises first and second electrodes overlying and underlying, respectively, the strip and means for applying a potential difference between the first and second electrodes.

15. A device according to any of claims 2 through 6 and 10 through 14, wherein both said portions comprise electro-optic material.

16. A device according to claim 2, wherein the material is electro-optic, the strip is embedded in the material with the said one-of the portions adjacent one surface of the strip, and the varying means comprises first and second electrodes disposed laterally of the strip at opposite sides of said one of said portions and moans of applying a potential difference between the electrodes, the other of said portions being adjacent an opposite surface of the strip.

17. A device according to claim 2, wherein the material is magneto-optic and the varying means comprises means for establishing a current flowing in at least one of the strip and an adjacent electrode, the said one of the portions being between the electrode and the strip.

18. A device according to claim 2, wherein the material is thermo-optic, at least one electrode is provided adjacent to the strip with said one of the portions therebetween, and the varying means comprises means for establishing a temperature difference between the strip and the electrode.

19. A device according to claim 2, further comprising a plurality of waveguide structures similar in construction to the first-mentioned structure and each comprising one of a plurality of said strips, the plurality of strips having respective proximal ends juxtaposed to one end of the first-mentioned strip to form a combiner/splitter, the arrangement being such that said optical radiation leaving said first-mentioned strip via said one end will be split between said plurality of strips and conversely said optical radiation coupled to said one end by said plurality of strips will be combined to leave said first-mentioned strip by an opposite end, wherein the varying means is coupled to at least one of the plurality of strips.

20. A device according to claim 19, wherein the material is electro-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the portions therebetween and means for applying a potential difference between the electrode and said one of the branch strips.

21. A device according to claim 20, wherein the varying means further comprises a second electrode adjacent the other branch strip with a second one of said portions therebetween and means for applying a second potential difference between the second electrode and the second branch strip.

22. A device according to claim 19, wherein the material is magneto-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the portions therebetween and means for establishing a current flowing in said electrode and said one of the branch strips.

23. A device according to claim 22, wherein the varying means further comprises a second electrode adjacent the other branch strip with a second one of said portions therebetween and means for establishing a second current flowing in the second electrode and the second branch strip.

24. A device according to claim 19, wherein the varying means comprises a coil formed by metal-plated via holes and surface conductors.

25. A device according to claim 19, wherein the varying means comprises a solenoid having magnetic poles either side of the strip.

26. A device according to claim 19, wherein the material is thermo-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the portions therebetween and means for establishing a temperature difference between said electrode and said one of the branch strips.

27. A device according to claim 26, wherein the varying means further comprises a second electrode adjacent the other branch strip with a second one of said portions therebetween and means for establishing a second temperature difference between the second electrode and the second branch strip.

28. A device according to claim 1, wherein the strip is straight, curved, bent, or tapered.

29. An optical device according to claim 1, wherein said free charge carrier density of the surrounding material is substantially negligible.

30. An optical device according to claim 1, wherein the strip is inhomogeneous.

31. An optical device according to claim 1, wherein the strip comprises an electron gas-supporting region.

32. A device according to claim 1, wherein the strip is selected from the group including gold, silver, copper, aluminium and highly n- or p-doped GaAs, InP or Si.

33. A device according to claim 1, wherein said material is selected from the group including glass, quartz, polymer and undoped or lightly doped GaAs, InP or Si.

34. A device according to claim 1, wherein said strip is gold and said material is silicon dioxide.

35. A device according to claim 1, for optical radiation having a free-space wavelength near 1550 nm, wherein the strip comprises a metal and has substantially square cross-section of thickness and width less than about 300 nm.

36. A device according to claim 1, wherein the width and thickness of the strip are each in the range from about 40 nm to about 1000 nm such that optical radiation having a wavelength in the range from about 500 nm to about 10,000 nm couples to the strip and propagates along the length of the strip as a plasmon-polariton wave.

37. A device according to claim 36, wherein the width and thickness of the strip are each in the range from about 40 nm to about 70 nm such that optical radiation having a wavelength about 500 nm couples to the strip and propagates along the length of the strip as a plasmon-polariton wave.

38. A device according to claim 36, wherein the width and thickness of the strip are each in the range from about 500 nm to about 2,000 nm such that optical radiation having a wavelength about 10,000 nm couples to the strip and propagates along the length of the strip as a plasmon-polariton wave.

39. A device according to claim 34, wherein the strip comprises gold and has a thickness of about 180 nm and width of about 180 nm.

40. A device according to claim 32, wherein the strip comprises aluminium and has a thickness of about 200 nm and width of about 200 nm, the surrounding material being $SiO_2$.

41. An optical device according to claim 30, wherein the strip comprises a sandwich of different metals.

42. An optical device according to claim 41, wherein the strip comprises a layer of gold sandwiched between layers of titanium and/or molybdenum.

43. A device according to claim 30, wherein the strip comprises a plurality of layers or a continuously variable material composition.

44. A device according to claim 1, further comprising at least a second said waveguide structure similar to the first-mentioned waveguide structure, the second waveguide structure comprising a second said strip having one end coupled to the first-mentioned strip, wherein the first-mentioned strip is curved and the second strip is offset outwardly relative to an axis of curvature of the first-mentioned strip.

45. A device according to claim 44, wherein the second strip is curved oppositely to the first strip such that the first and second strips form an S-bend.

46. A device according to claim 45, further comprising third and fourth said waveguide structures comprising third and fourth strips, respectively, the third strip having one end coupled to an end of the first strip opposite that connected to the second strip and the fourth strip having one end coupled to an end of the second strip opposite that connected to the first strip, the third and fourth strips each being offset outwardly relative to an axis of curvature of the strip to which it is coupled.

47. A device according to claim 1, further comprising at least two additional said waveguide structures comprising second and third strips, respectively, the second strip for inputting said radiation to one end of said first-mentioned strip and the third strip for receiving said radiation from the opposite end of said first-mentioned strip, wherein the first-mentioned strip is curved and said second and third strips are each offset outwardly relative to an axis of curvature of the first-mentioned strip.

48. A device according to claim 1, further comprising at least second and third waveguide structures both similar in construction to the first-mentioned waveguide structure and having second and third strips, respectively, the second and third strips having respective ends coupled in common to one end of the strip of the first-mentioned waveguide structure to form respective arms of a combiner/splitter, the arrangement being such that said optical radiation leaving said first-mentioned strip via said one end will be split between said second and third strips and conversely said optical radiation coupled to said one end by said second and third strips will be combined to leave said first-mentioned strip by an opposite end.

49. A device according to claim 48, further comprising a transition waveguide structure coupling the second and third strips to the first-mentioned strip, the transition waveguide structure being similar in construction to the first-mentioned waveguide structure and comprising a strip having a narrower end coupled to the first-mentioned strip and a wider end, the second and third strips being coupled together to the wider end.

50. A device according to claim 49, wherein the second and third strips each comprise an S-bend, and the S-bends diverge away from the wider end of the transition strip.

51. A device according to claim 48, 49 or 50, further comprising a second combiner/splitter similar in construction to the first combiner/splitter and connected to the first combiner/splitter to form a Mach-Zender interferometer, each arm of the first combiner/splitter being connected to a respective one of the arms of the second combiner/splitter to form a corresponding interferometer arm, the arrangement being such that optical radiation input via said first strip of the first combiner/splitter produces two plasmon-polariton wave portions which propagate along, respectively, arms of the Mach-Zender interferometer and are recombined by the second combiner/splitter.

52. A device according to claim 51, wherein each arm of the first combiner/splitter is connected to a respective arm of the second combiner/splitter by a respective intermediate section of waveguide structure similar in construction to the first waveguide structure, and the device further comprises means for adjusting the characteristics of one of said intermediate sections relative to those of the other intermediate section and thereby propagation characteristics of the corresponding one of said two plasmon-polariton wave portions so as to obtain destructive interference upon recombination and thereby modulate the intensity of said optical radiation.

53. A device according to claim 52, wherein the material surrounding the strip of the waveguide structure whose characteristics are adjusted is electro-optic, and the adjusting means establishes an electric field in said electro-optic material and varies said electric field so as to vary the refractive index of the electro-optic material.

54. A device according to claim 53, wherein the adjusting means comprises a pair of electrodes spaced apart with the strip between them and a voltage source connected to the electrodes for applying a voltage between the electrodes so as to establish said electric field in said electro-optical material.

55. A device according to claim 53, wherein the adjusting means comprises at least one electrode adjacent the strip of the waveguide structure whose characteristics are adjusted and a voltage source for applying said voltage between the electrode and said strip so as to establish said electric field in said material therebetween.

56. A device according to claim 53, wherein the adjusting means comprises a pair of electrodes spaced apart with said strip therebetween and a voltage source connected between said strip and both electrodes, in common, for applying a voltage between the electrodes and the strip to establish said electric field in said electro-optic material.

57. A device according to claim 52, wherein the adjusting means is arranged to induce a magnetic field in said at least one of the parallel branches.

58. A device according to claim 52, wherein the adjusting means modulates the intensity of said optical radiation substantially to extinction.

59. A device according to claim 1, further comprising at least two additional waveguide structures, the at least three waveguide structures arranged to form an intersection, respective strips of the at least three waveguide structures each having one end connected to juxtaposed ends of the other strips to form said intersection, distal ends of the at least three strips constituting ports such that optical radiation input via the distal end of one of the strips will be conveyed across the intersection to emerge from at least one of the other strips.

60. A device according to any one of claims 44 through 50 and 52 through 83, wherein said strips are integral with each other.

61. A device according to claim 1, further comprising at least a second waveguide structure similar in construction to the first-mentioned waveguide structure, the first and second waveguide structures being arranged to form a coupler, first and second strips or the first and second waveguide structures, respectively, extending parallel to each other and in close proximity such that propagation of said optical radiation is supported by both strips, the device further comprising input means for inputting said optical radiation to at least said first strip and output means for receiving at least a portion of said optical radiation from at least said second strip.

62. A device according to claim 61, wherein the first and second strips are not coplanar.

63. A device according to claim 61 or 62, further comprising means for adjusting the characteristics of at least one of the first and second waveguide structures and thereby propagation characteristics of said plasmon-polariton wave propagating along the coupled ships so as to control the degree of coupling between the strips.

64. A device according to claim 61 or 62, wherein the material between the coupled strips is electro-optic and further comprising adjusting means for establishing an electric field in said electro-optic material and varying said electric field so as to vary the refractive index of the electro-optic material between the strips.

65. A device according to claim 64, wherein the adjusting means comprises a voltage source connected to the coupled strips for applying a voltage between the strips so as to establish said electric field in the said electro-optic material.

66. A device according to claim 64, wherein the adjusting means comprises at least one electrode adjacent at least one of the coupled strips and a voltage source for applying a voltage between the electrode and at least one of the coupled strips so as to establish said electric field in said material therebetween.

67. A device according to claim 61 or 62, wherein the material surrounding at least one of the coupled ships is electro-optic and the adjusting means comprises a pair of electrodes spaced apart with said at least one of the coupled strips between them and a voltage source connected to the electrodes for applying a voltage between the electrodes so as to establish an electric field in said electro-optic material, variation of said voltage causing a corresponding variation in the refractive index of said electro-optic material.

68. A device according to claim 61 or 62, wherein the material surrounding at least one of the strips is electro-optic, and the adjusting means comprises a pair of electrodes spaced apart with said at least one of the coupled strips therebetween and a voltage source connected between said at least one of the coupled strips and both electrodes, in common, for applying a voltage between the electrodes and said at least one of the strips to establish an electric field in said electro-optic material, variation of said voltage causing a corresponding variation in the refractive index of said electro-optic material.

69. A device according to any one of claims 61, 62, 65 and 66, wherein the input means and the output means each comprise a pair of waveguide structures similar in construction to the first waveguide structure, and each pair comprises a pair of strips connected at one end to the respective ends of the coupled strips and diverging away therefrom so that distal ends of each pair of strips are spaced apart by a distance significantly greater than the spacing between the coupled strips.

70. A device according to claim 69, wherein each of said diverging strips comprises an S-bend.

71. A device according to claim 1, wherein the surrounding material is inhomogeneous.

72. A device according to claim 71, wherein the surrounding material comprises a continuously variable material composition or a combination of slabs and/or strips and/or laminae.

73. A device according to claim 71, wherein the strip is inhomogeneous.

74. A device according to claim 73, wherein the strip comprises a plurality of layers or a continuously variable material composition.

75. A device according to claim 2, wherein the material of at least one of the portions is inhomogeneous.

76. A device according to claim 75, wherein said material of at least one of the portions comprises a combination of slabs, strips, laminae, or continuously variable material composition.

77. An optical device according to claim 2, wherein the strip is inhomogeneous.

78. An optical device according to claim 75, wherein the strip is inhomogeneous.

79. A device according to claim 78, wherein the strip comprises a plurality of layers or a continuously variable material composition.

80. A device according to claim 77, wherein the strip comprises a plurality of layers or a continuously variable material composition.

81. An optical device according to claim 77, wherein the strip comprises a sandwich of different metals.

82. An optical device according to claim 81, wherein the strip comprises a layer of gold sandwiched between layers of titanium and/or molybdenum.

83. A device according to claim 2, wherein said relatively low free charge carrier density is substantially negligible.

84. A device according to claim 2, wherein the strip is straight, curved, bent, or tapered.

85. A device according to claim 2, wherein the strip is selected from the group consisting of gold, silver, copper, aluminium and highly n- or p-doped GaAs, InP or Si.

86. A device according to claim 2, wherein said material is selected from the group consisting of glass, quartz, polymer and undoped or lightly doped GaAs, InP or Si.

87. A device according to claim 2, for optical radiation having a free-space wavelength near 1550 nm, wherein the strip comprises a metal and has substantially square cross-section of thickness and width less than about 300 nm.

88. A device according to claim 2, wherein the width and thickness of the strip are each in the range from about 40 nm to about 1000 nm such that optical radiation having a wavelength in the range from about 500 nm to about 10,000 nm couples to the strip and propagates along the length of the strip as a plasmon-polariton wave.

89. A device according to claim 2, wherein the width and thickness of the strip are each in the range from about 40 nm to about 70 nm such that optical radiation having a wavelength about 500 nm couples to the strip and propagates along the length of the strip as a plasmon-polariton wave.

90. A device according to claim 2, wherein the width and thickness of the strip are each in the range from about 500 nm to about 2,000 nm such that optical radiation having a wavelength about 10,000 nm couples to the strip and propagates along the length of the strip as a plasmon-polariton wave.

91. An optical device according to claim 2, wherein the strip comprises an electron gas-supporting region.

92. A device according to any one of claims 2 through 14, 16 through 27 and 75 through 91, wherein, for one said value of the electromagnetic property for said one of the portions, propagation of the plasmon-polariton wave is supported and, for another value of said electromagnetic property of said one of said portions, propagation of the plasmon-polariton wave is not supported.

93. A device according to claim 51, wherein said strips are integral with each other.

94. A device according to claim 67, wherein the input means and the output means each comprise a pair of waveguide structures similar in construction to the first waveguide structure, and each pair comprises a pair of strips connected at one end to the respective ends of the coupled strips and diverging away therefrom so that distal ends of each pair of strips are spaced apart by a distance significantly greater than the spacing between the coupled strips.

95. A device according to claim 68, wherein the input means and the output means each comprise a pair of waveguide structures similar in construction to the first waveguide structure, and each pair comprises a pair of strips connected at one end to the respective ends of the coupled strips and diverging away therefrom so that distal ends of each pair of strips are spaced apart by a distance significantly greater than the spacing between the coupled strips.

96. A device according to claim 15, wherein, for one said value of the electromagnetic property for said one of the portions, propagation of the plasmon-polariton wave is supported and, for another value of said electromagnetic property of said one of said portions, propagation of the plasmon-polariton wave is not supported.

97. A device according to claim 63, wherein the input means and the output means each comprise a pair of waveguide structures similar in construction to the first waveguide structure, and each pair comprises a pair of strips connected at one end to the respective ends of the coupled strips and diverging away therefrom so that distal ends of each pair of strips are spaced apart by a distance significantly greater than the spacing between the coupled strips.

98. A device according to claim 64, wherein the input means and the output means each comprise a pair of waveguide structures similar in construction to the first waveguide structure, and each pair comprises a pair of strips connected at one end to the respective ends of the coupled strips and diverging away therefrom so that distal ends of each pair of strips are spaced apart by a distance significantly greater than the spacing between the coupled strips.

* * * * *